(12) United States Patent
Ko et al.

(10) Patent No.: US 11,200,165 B2
(45) Date of Patent: Dec. 14, 2021

(54) SEMICONDUCTOR DEVICE

(71) Applicant: SAMSUNG ELECTRONICS CO., LTD., Suwon-si (KR)

(72) Inventors: Sang Soo Ko, Yongin-si (KR); Jae Gon Kim, Hwaseong-si (KR); Kyoung Young Kim, Suwon-si (KR); Sang Hyuck Ha, Yongin-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 75 days.

(21) Appl. No.: 16/526,452

(22) Filed: Jul. 30, 2019

(65) Prior Publication Data
US 2020/0174928 A1 Jun. 4, 2020

(30) Foreign Application Priority Data
Dec. 3, 2018 (KR) .................. 10-2018-0153279

(51) Int. Cl.
G06F 12/0802 (2016.01)
G06F 13/42 (2006.01)
G06F 3/06 (2006.01)
G06N 3/08 (2006.01)

(52) U.S. Cl.
CPC ........ *G06F 12/0802* (2013.01); *G06F 3/0604* (2013.01); *G06F 3/0655* (2013.01); *G06F 3/0673* (2013.01); *G06F 13/4282* (2013.01); *G06N 3/08* (2013.01); *G06F 2212/60* (2013.01)

(58) Field of Classification Search
CPC .. G06F 12/0802; G06F 3/0604; G06F 3/0655; G06F 3/0673; G06F 13/4284; G06F 2212/60; G06N 3/08
See application file for complete search history.

(56) References Cited

U.S. PATENT DOCUMENTS

| | | | |
|---|---|---|---|
| 7,412,588 B2 | 8/2008 | Georgiou et al. | |
| 7,802,023 B2 | 9/2010 | Yamazaki et al. | |
| 7,822,946 B2 | 10/2010 | Sharma | |
| 9,135,185 B2* | 9/2015 | Loh | H01L 25/18 |
| 9,417,754 B2 | 8/2016 | Smith | |
| 9,432,298 B1 | 8/2016 | Smith | |
| 9,740,646 B2 | 8/2017 | Morris et al. | |
| 2010/0070696 A1* | 3/2010 | Blankenship | G11C 5/04 |
| | | | 711/105 |
| 2016/0292115 A1 | 10/2016 | Akhter | |
| 2017/0220499 A1 | 8/2017 | Gray | |

* cited by examiner

*Primary Examiner* — Idriss N Alrobaye
*Assistant Examiner* — Richard B Franklin
(74) *Attorney, Agent, or Firm* — F. Chau & Associates, LLC

(57) ABSTRACT

A semiconductor device is provided. The semiconductor device comprises a first memory unit including a first memory area, and a first logic area electrically connected to the first memory area, the first logic area including a cache memory and an interface port. The first memory unit executes a data transmission and reception operation with a memory unit adjacent to the first memory unit via the first interface port and the cache memory.

16 Claims, 25 Drawing Sheets

Fig. 13

| Logical Address | Physical Address |   |
|---|---|---|
| LA_0 | MPA_0 | ⎫ |
| LA_1 | MPA_1 | ⎬ Memory Area(110) |
| ⋮ | ⋮ | |
| LA_998 | MPA_998 | |
| LA_999 | MPA_999 | ⎭ |
| LA_1000 | LPA_0 | ⎫ |
| ⋮ | ⋮ | ⎬ Cache Memory Area(138) |
| LA_1399 | LPA_399 | ⎭ |
| LA_1400 | LPA_400 | ⎫ |
| ⋮ | ⋮ | ⎬ Cache Control Area(139) |
| LA_1499 | LPA_499 | ⎭ |

| Ctrl Instruction | Active |
|---|---|
| ID_MU (Src) | ID_MU (Dst) |
| ADD_MU (Start) | Length |

SEMICONDUCTOR DEVICE

CROSS-REFERENCE TO RELATED APPLICATION

This U.S. non-provisional patent application claims priority under 35 U.S.C. § 119 to Korean Patent Application No. 10-2018-0153279, filed on Dec. 3, 2018, in the Korean Intellectual Property Office, the disclosure of which is incorporated by reference in its entirety herein.

BACKGROUND

1. Technical Field

The present disclosure relates to a semiconductor device, and more particularly, to a semiconductor device with process having an improved processing speed and accuracy.

2. Discussion of Related Art

An artificial intelligence (AI) system is a computer system that is able to perform tasks that normally require human intelligence, unlike a rule-based smart system. User preferences may be understood more accurately by an AI system. Machine learning is a method of data analysis that automates analytical model building. Machine learning is a branch of AI based on the idea that systems can learn from data, identify patterns, and make decisions with minimal human intervention. Consequently, rule-based smart systems are gradually being replaced by machine learning-based AI systems.

Technological fields such as linguistic understanding, visual understanding, inference/prediction, knowledge expression, and motion control may make use of machine learning-based AI systems.

A machine learning algorithm requires operations capable of processing an enormous amount of data. The accuracy of results calculated by the machine learning algorithm can be improved when the same operation can be used to process large portions of the data.

An artificial neural network that utilizes the deep learning is trained using a large amount of data, and performs a parallel operation through a plurality of operators to enhance the operation speed.

SUMMARY

At least one exemplary embodiment of the present inventive concept provides a semiconductor device including memories and a processor with improved processing speed and accuracy through data transmission and reception performed between the memories.

According to an exemplary embodiment of the present inventive concept, there is provided a semiconductor device comprising a first memory unit including a first memory area, and a first logic area electrically connected to the first memory area. The first logic area includes a cache memory and an interface port for executing a data transmission and reception operation. The first memory unit executes the data transmission and reception operation with a memory unit adjacent to the first memory unit via the first interface port using the cache memory.

According to an exemplary embodiment of the present inventive concept, there is provided a semiconductor device comprising a plurality of first memory units each including a cache memory and an interface port, and a first processing unit which is electrically connected to the plurality of first memory units and executes an operation based on data stored in the plurality of first memory units. The plurality of first memory units executes a data transmission and reception operation between the plurality of first memory units, using the cache memory and the interface port.

According to an exemplary embodiment of the present inventive concept, there is provided a semiconductor device comprising a first processing unit and a second processing unit, a plurality of first memory units, a plurality of second memory units, and a scheduler. The plurality of first memory units are electrically connected to the first processing unit and each include a first memory area and a first cache area. Each of the first memory area and the first cache area share a logical address. The plurality of second memory units are electrically connected to the second processing unit and each include a second memory area and a second cache area. The second memory area and the second cache area share the logical address. The scheduler schedules a transmission and reception path between the first memory unit and the second memory unit on target data stored in the first memory area or the second memory area. The scheduler schedules the transmission and reception path on the basis of path information stored in the first cache area or the second cache area.

According to an exemplary embodiment of the present inventive concept, there is provided a semiconductor device comprising a first processor and a compiler. The first processor is electrically connected to a first memory unit including at least one memory and executes an operation on a training dataset. The compiler generates a scheduling code of a path of data to be moved in an operation process of the training data. The scheduling code includes information on a first path in which the data is moved between the first processor and the first memory unit, and a second path in which the data is moved between memories included in the first memory unit. The first processor executes the operation of the training dataset on the basis of the scheduling code.

BRIEF DESCRIPTION OF THE DRAWINGS

The present inventive concept will become more apparent by describing in detail exemplary embodiments thereof with reference to the attached drawings, in which:

FIG. 13 is a mapping table for explaining mapping between the physical address and the logical address of each of the memory area and the logic area;

FIG. 14*c* is a diagram for explaining an instruction stored in the cache control area as an example;

DETAILED DESCRIPTION OF THE EXEMPLARY EMBODIMENTS

Figure 1:
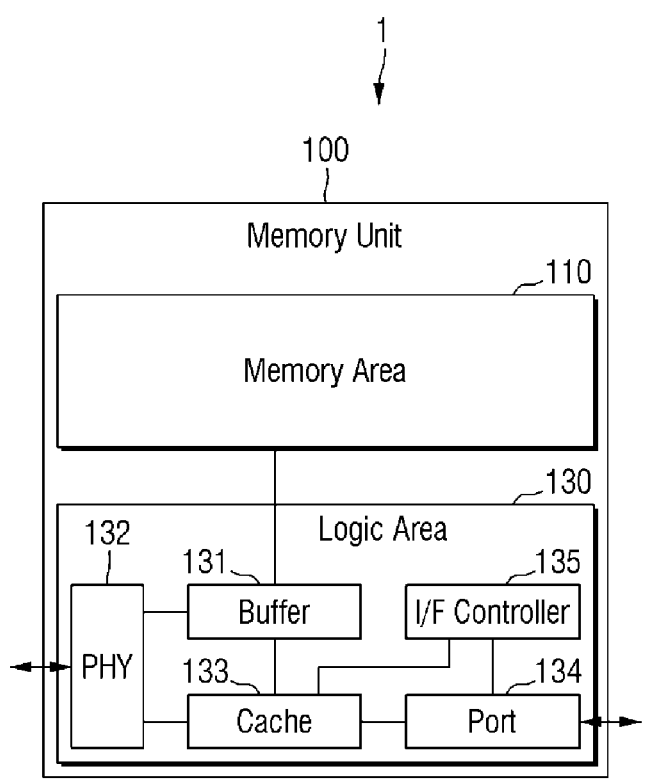
FIG. 1 is a schematic block diagram for explaining a configuration of a memory unit according to an exemplary embodiment of the present inventive concept.

FIG. 1 is a schematic block diagram for explaining a configuration of a memory unit (e.g., a memory device) according to an exemplary embodiment of the present inventive concept.

Referring to FIG. 1, a semiconductor device 1 according to an embodiment of the present inventive concept includes a memory unit 100 including a memory area 110 and a logic area 130. In an exemplary embodiment, the memory area 110 is implemented by a nonvolatile memory.

User data as requested by the user, data processed by a processing unit or data to be processed may be stored in the memory area 110.

The logic area 130 may include a memory buffer 131, a PHY 132, a cache memory 133, an interface port 134 and an interface controller 135 (e.g., a control circuit). In an embodiment, the PHY 132 is circuitry requires to implement physical layer functions. The PHY 132 may connect a link layer device to a physical medium such as optical fiber or copper wire. The interface port 134 may serve as an interface between the semiconductor device 1 and a device external to the semiconductor device 1.

The memory buffer 131 may read and buffer the data stored in the memory area 110 and transmit the data to the cache memory 133 or the PHY 132. Also, the memory buffer 131 may receive commands, addresses, data, and the like from the processing unit (10 of FIG. 5) via the PHY 132.

Figure 5:
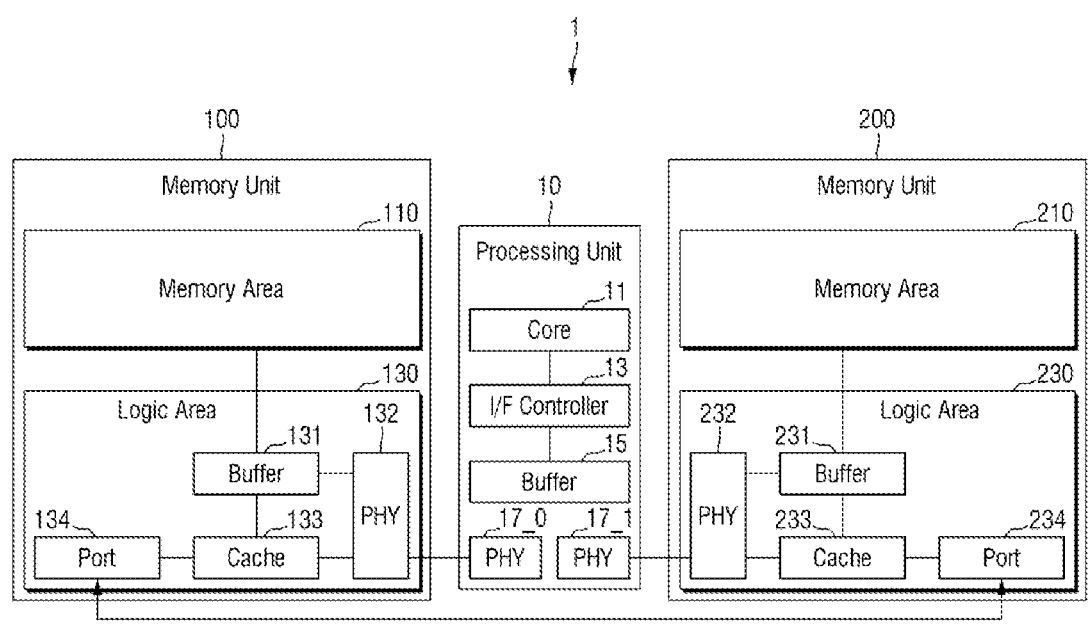
FIG. 5 is a block diagram for explaining a configuration of a processing unit and two memory units connected to the processing unit according to an exemplary embodiment of the present inventive concept.

The PHY 132 may output the data stored in the memory buffer 131 or the cache memory 133 to the processing unit (10 of FIG. 5). That is, the processing unit and the memory unit 100 may interface with each other via the PHY 132. Data transmission and reception between the memory unit 100 and the processing unit connected to the memory unit 100 will be described below with reference to FIG. 5.

The cache memory 133 may temporarily store data stored in the memory area 110 or data to be stored in the memory area 110 under the control of the interface controller 135. According to an embodiment, data stored in the memory area 110 for data transfer to an adjacent memory unit 100 is stored in the memory buffer 131, and the cache memory 133 receives and store data from the memory buffer 131. According to an embodiment, the cache memory 133 temporarily stores data received from the adjacent memory unit 100.

The interface port 134 may transmit and receive data to and from an adjacent memory unit adjacent to the memory unit 100. According to an embodiment, the interface port 134 transmits the data stored in the cache memory 133 to the adjacent memory unit under the control of the interface controller 135. According to an embodiment, the interface port 134 transmits the data received from the adjacent memory unit to the cache memory 133 under the control of the interface controller 135.

According to an embodiment, the interface port 134 executes a data transmission and reception operation with the adjacent memory unit, using a serial interface. For example, the interface port 134 may apply its own standard serial interface, or may adopt at least one of serial interface rules, such as a PCIe (Peripheral Component Interconnect Express), an NVMe (Nonvolatile Memory Express), a UFS (Universal Flash Storage), a USB (Universal Serial Bus), a SCSI (Small Computer System Interface), a SATA (Serial Advanced Technology Attachment), a SAS (Serial Attached SCSI), a SD (Secure Digital) card, and eMMC (Embedded Multimedia Card) which are standard serial interface rules.

The interface controller 135 may control the data transmission and reception operation with the adjacent memory unit. For example, the interface controller 135 may control the memory area 110, the memory buffer 131, the cache memory 133 and the interface port 134 to receive data from the adjacent memory unit and store the data in the cache memory 133 or the memory area 110 of the memory unit 100. In an exemplary embodiment, the interface controller 135 performs a control so that data is stored in a specific area of the memory area 110 via the memory buffer 131 after storing the data received from the adjacent memory unit via the interface port 134 in the cache memory 133.

According to an exemplary embodiment, the interface controller 135 controls the interface port 134 and the cache memory 133 to transmit the received data to another adjacent memory unit after receiving data from the adjacent memory unit. Specifically, the interface controller 135 may control the cache memory 133 and the interface port 134 to transmit the data stored in the cache memory 133 to another adjacent memory unit, after storing the data received via the interface port 134 in the cache memory 133. For example, the interface controller 135 of a first memory unit 110 can receive data from a second memory unit 100, temporarily store the received data in the cache memory 133, and then transmit the data stored in the cache memory 133 to a third memory unit 100, potentially bypassing storage of the data into the memory area 110 of the first memory unit 110. In an exemplary embodiment, the logic area 130 furthers include an interface port for communicating with another adjacent memory unit. For example, the interface port 134 may include a first interface port for communicating with the second memory unit 100 and a second interface port for communicating with the third memory unit 100, or the interface port 134 may be a single port capable of communicating with multiple external memory units 100. According to the embodiment, the interface port 134 may be used to perform communication with adjacent memory units different from each other. That is, it is possible to perform data transmission and reception with the adjacent memory units different from each other, using one interface port 134.

According to an exemplary embodiment, the memory area 110, the memory buffer 131, the cache memory 133 and the interface port 134 may be controlled to transmit data stored in the memory area 110 to the adjacent memory unit. Specifically, the data stored at a specific address in the memory area 110 is read and stored in the memory buffer 131, the data is cached in the cache memory 133, and then the data stored in the cache memory 133 is transmitted to the adjacent memory via the interface port 134.

For convenience of explanation, the interface controller 135 is illustrated as being located in the logic area 130 of the memory unit 100, but is not limited thereto, and the interface controller 135 may be disposed in an external area of the memory unit 100.

Figure 2:
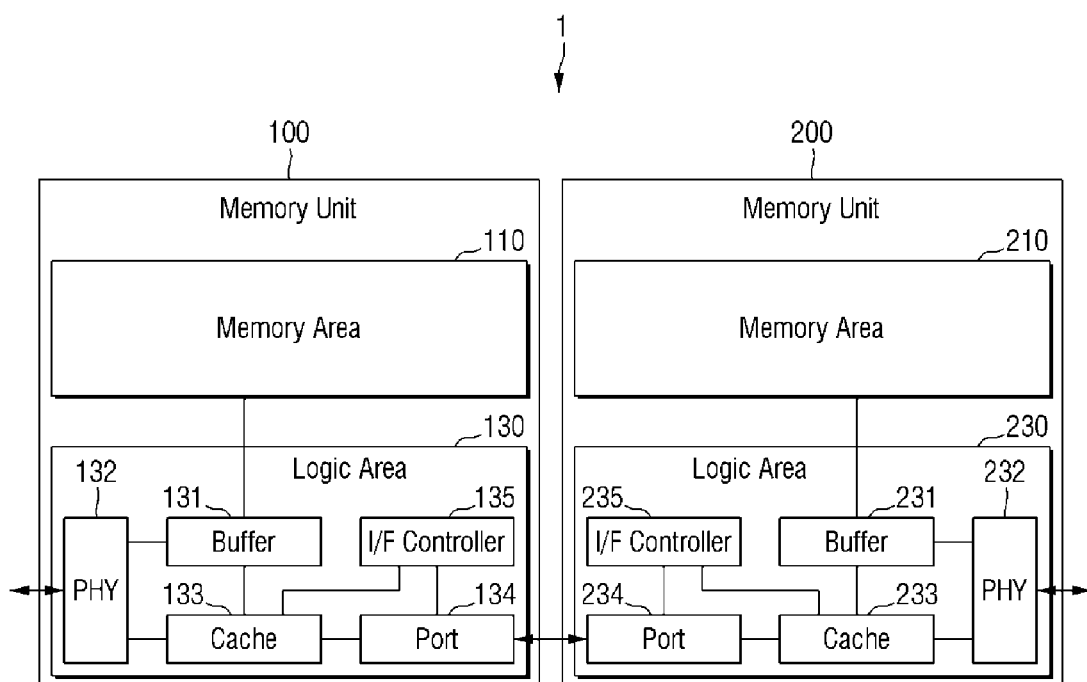
FIG. 2 is a block diagram for explaining a configuration of two memory units connected via an interface port according to an exemplary embodiment of the present inventive concept.

FIG. 2 is a block diagram for explaining a configuration of two memory units connected via an interface port according to an exemplary embodiment of the present inventive concept.

Referring to FIG. 2, the semiconductor device 1 according to the embodiment of the present inventive concept includes a first memory unit 100 including the first memory area 110 and the first logic area 130, and a second memory unit 200 including a second memory area 210 and a second logic area 230. The first memory unit 100 is configured in the same manner as the memory unit 100 of FIG. 1. Further, the configurations of the second memory area 210 and the second logic area 230 of the second memory unit 200 may perform the same operation as the configurations of the first memory area 110 and the first logic area 130 of the first memory unit 100. The second logic area 230 includes a second memory buffer 231, a second PHY 232, a second cache memory 233, a second interface port 234, and a second interface controller 235.

The semiconductor device 1 according to the embodiment of the present inventive concept may execute a data transmission and reception operation with the adjacent memory units. The first memory unit 100 and the second memory unit 200 are disposed adjacent to each other, and perform the data transmission and reception via the first interface port 134 and the second interface port 234. The first interface controller 135 controls the input/output operation of data received at the first interface port 134 or data transmitted from the first interface port 134, and the second interface controller 235 controls the input/output operation of the data received at the second interface port 234 or the data transmitted from the second interface port 234.

Figure 3:
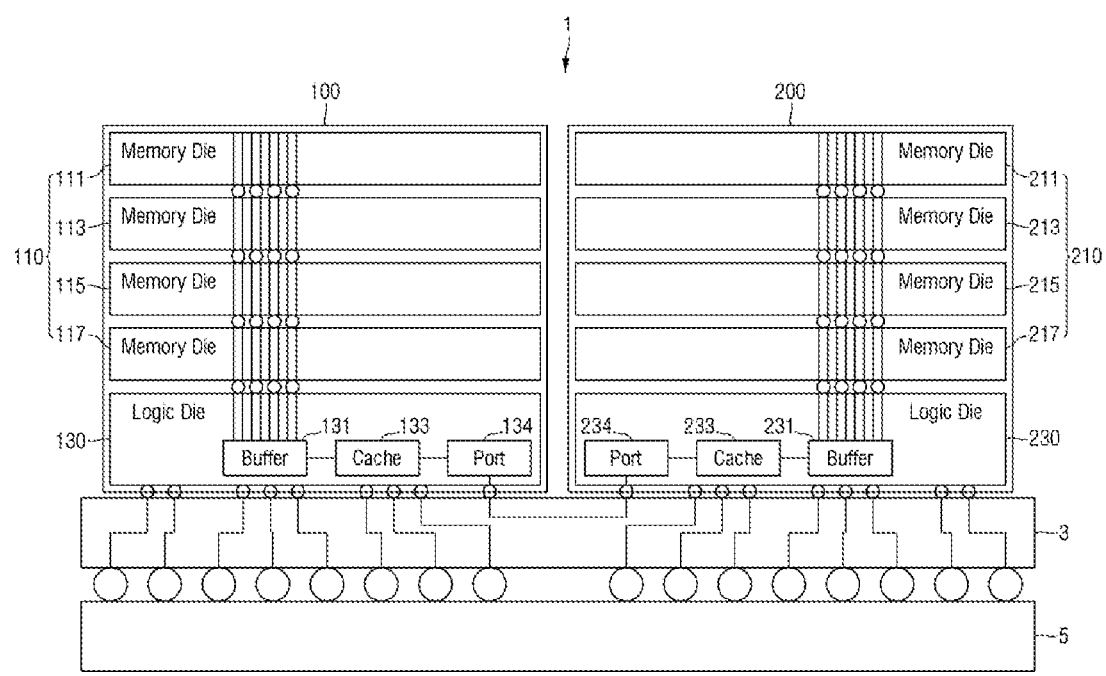
FIG. 3 is a cross-sectional view of the memory unit for explaining a cache memory and an interface port disposed in a logic area according to an exemplary embodiment of the present inventive concept.

FIG. 3 is a cross-sectional view of a memory unit for explaining a cache memory and an interface port disposed in the logic area according to an exemplary embodiment of the present inventive concept. For convenience of explanation, a stacked type memory unit is illustrated as an example to which an embodiment of the present inventive concept may be applied, but the present inventive concept is not limited thereto, and may be applied to a single layer type memory or a stacked memory having an arrangement different from the arrangement illustrated in FIG. 3.

Referring to FIG. 3, the semiconductor device 1 according to an exemplary embodiment of the present inventive concept includes a substrate 5, an interposer 3 stacked on the substrate 5, and a first memory unit 100 and a second memory unit 200 each disposed on the interposer 3.

The first memory unit 100 may include a first logic area 130, and a first memory area 110 including a plurality of memory dies 111, 113, 115 and 117 stacked on the first logic area 130 in a vertical direction. The first memory area 110 may include at least one first memory dies 111, 113, 115 and 117 including a plurality of memory cells in which data is stored. Each of the memory dies 111, 113, 115 and 117 and the first logic area 130 may be connected to each other via a TSV (Through Silicon Via). For convenience of explanation, the first memory area 110 is illustrated to include the four dies 111, 113, 115 and 117, but is not limited thereto, and may include less than four memory dies or more than four memory dies. In addition, FIG. 3 illustrates an exemplary cross-sectional view in which the memory unit may be configured, but other forms of memory may be applied.

The second memory unit 200 may have the same configuration as the first memory unit 100. That is, the second memory unit 200 may include a second logic area 230, and a second memory area 210 including a plurality of memory dies 211, 213, 215 and 217 stacked on the second logic area 230 in the vertical direction, and each of the memory dies 211, 213, 215 and 217 and the first logic area 130 are connected to each other via the TSV, and may transmit and receive the data. The second memory area 210 may include at least one second memory dies 211, 213, 215 and 217 including a plurality of memory cells in which data is stored.

A semiconductor device 1 according to at least one embodiment of the present inventive concept may execute the data transmission and reception operation with an adjacent memory unit, by disposing the cache memories 133 and 233 and the interface ports 134 and 234 in the logic areas 130 and 230. By disposing the cache memories 133 and 233 and the interface ports 134 and 234 in the logic areas 130 and 230 which do not include a memory cell storing user data or data to be processed by a processing unit, direct data transmission and reception with the adjacent memory units is enabled without substantially increasing the area of the semiconductor device 1. Also, as described above, data transmission and reception with the adjacent memory units may be executed, using a serial interface.

Figure 4:
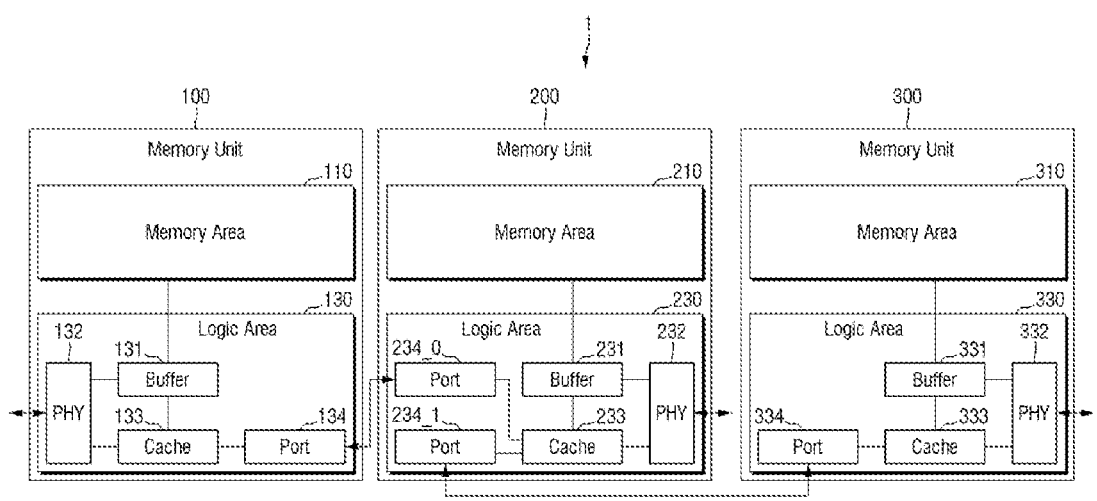
FIG. 4 is a block diagram for explaining a configuration of three memory units connected via the interface port according to an exemplary embodiment of the present inventive concept.

FIG. 4 is a block diagram for explaining a configuration of three memory units connected via an interface port according to an exemplary embodiment of the present inventive concept. For example, the semiconductor device 1 may additionally include a third memory unit 300 including a third memory area 310 and a third logic area 330. For example, the third logic area 330 may include a third memory buffer 331, a third PHY 332, a third cache memory 333, and a third interface port 334. It is assumed that the first memory unit 100 of FIG. 4 has the same configuration as the memory unit 100 of FIG. 1. Also, for convenience of explanation, it is illustrated that the first logic area 130, the second logic area 230, and the third logic area 330 do not include the interface controller, but each of the first logic area 130, the second logic area 230, and the third logic area 330 may include an interface controller which controls data transmission and reception with the adjacent memory unit. In addition, it is assumed that the first memory unit 100 and the second memory unit 200 are disposed adjacent to each other, the second memory unit 200 and the third memory unit 300 are disposed adjacent to each other, and the first memory unit 100 and the third memory unit 300 are not disposed adjacent to each other.

Referring to FIG. 4, the semiconductor device 1 according to the embodiment of the present inventive concept includes a memory unit 200 including a plurality of interface ports 234_0 and 234_1. As illustrated, the second logic area 230 of the second memory unit 200 includes two second interface ports 234_0 and 234_1. That is, the second logic area 230 may include respective second interface ports 234_0 and 234_1 for performing the data transmission and reception with the first memory unit 100 and the third memory unit 300 which are the adjacent memory units. The data transmission and reception between the first memory unit 100 and the second memory unit 200 may be performed, using the first interface port 134 of the first memory unit 100 and the second interface port 234_0 of the second memory unit 200, and the data transmission and reception between the second memory unit 200 and the third memory unit 300 may be performed, using the third interface port 334 of the third memory unit 300 and the second interface port 234_1 of the second memory unit 200. As another example, the interface ports for data transmission with different adjacent memory units may be shared. That is, the second memory unit 200 may perform the data transmission and reception with the first memory unit 100 and the third memory unit 300, using the second interface port 234_0, or may perform the data transmission and reception with the first memory unit 100 and the third memory unit 300, using the second interface port 234_1.

According to at least one embodiment of the inventive concept, the data received from the adjacent memory is not stored in the memory area but is transmitted to another adjacent memory unit. In other words, when the memory unit is not a destination memory unit where the data finally arrives, the data is received from the adjacent memory unit and stored in the cache memory, and then the data stored in the cache memory is transmitted to another adjacent memory unit again. Hereinafter, a process of storing data stored in the first memory area 110 in the third memory area 310 will be described.

When target data which is a target for data transmission and reception between the memory units is stored in a specific address of the first memory area 110 included in the first memory unit 100 which is a source memory unit, and this target data is to be stored in the third memory area 310, the second memory unit 200 may receive the target data from the first interface port 134 via the second interface port 234_0. Since the second memory unit 200 is not a destination memory unit to which the data is to finally reach, the second memory unit 200 does not store the target data in the second memory area 210, and transmits the target data to the third memory unit 300 through the second interface port 234_1. In an embodiment, the target data is transmitted using the serial interface between the second interface port 234_1 and the third interface port 334. The target data transmitted to the third memory unit 300 via the third interface port 334 is stored in the third cache memory 333, and then may be sequentially stored in the third memory buffer 31 and a specific address of the third memory area 310.

According to an embodiment, the semiconductor device 1 may further include a scheduler (30 of FIG. 14) that schedules a transmission and reception path between a plurality of memory units connected to the second memory unit 200.

The process of moving the data based on scheduling of the scheduler will be described below with reference to FIGS. 14 to 19.

FIG. 5 is a block diagram for explaining the configuration of a processing unit and two memory units connected to the processing unit according to an exemplary embodiment of the present inventive concept. Repeated descriptions of the configuration and operation of the memory unit described using FIGS. 1 and 4 will not be provided.

Referring to FIG. 5, the semiconductor device 1 according to the embodiment of the present inventive concept includes the processing unit 10 electrically connected to the plurality of memory units 100 and 200. The processing unit 10 may be a graphic processing unit (GPU) that executes an operation based on data stored in the plurality of memory units 100 and 200, but the present inventive concept is not limited thereto, since different types of processors may be applied.

According to the embodiment, the processing unit 10 includes a processor core 11, an interface controller 13 and a buffer 15.

The processor core 11 executes an operation based on data stored in the memory units 100 and 200 electrically connected to the processing unit 10. For example, the processor core 11 may perform the processing operation on the basis of data stored in the first memory area 110 of the first memory unit 100 and data stored in the second memory area 210 of the second memory unit 200.

The interface controller 13 may control the data transmission and reception operation between the memory units 100 and 200 electrically connected to the processing unit 10. That is, as illustrated in FIGS. 1 and 2, the interface controller 13 may be arranged in the logic areas 130 and 230 included in each of the memory units 100 and 200, or may be included in the processing unit 10 in which the memory units 100 and 200 are electrically connected to each other.

The buffer 15 may store data received from the memory units 100 and 200 electrically connected to the processing unit 10 or data to be transmitted to the memory units 100 and 200. The buffer 15 may receive data from the first memory unit 100 via a PHY 132 and a PHY 17_0, and may receive data from the second memory unit 200 via a second PHY 232 and a PHY 17_1.

The plurality of memories 100 and 200 electrically connected to the processing unit 10 may execute a data transmission and reception operation with each other. That is, the first memory unit 100 and the second memory unit 200 connected to the processing unit 10 may include a first interface port 134 and a second interface port 234, respectively, and may directly transmit and receive data with each other, using the respective interface ports 134 and 234.

According to some embodiments, the processing unit 10 may include, for example, a GPU module, a TPU (tensor processing unit) module, a DPU (data processing unit) module, a MPU (main processing unit) module and the like. In the case of including the GPU module and the TPU module, the processing unit may include a GPU or a TPU, respectively, and may include a plurality of support chips. The TPU may be implemented, for example, on an ASIC, and may be configured or optimized for machine learning. According to at least one exemplary embodiment, the DPUs may operate similarly to other accelerators such as a TPU or a GPU.

Figure 6:
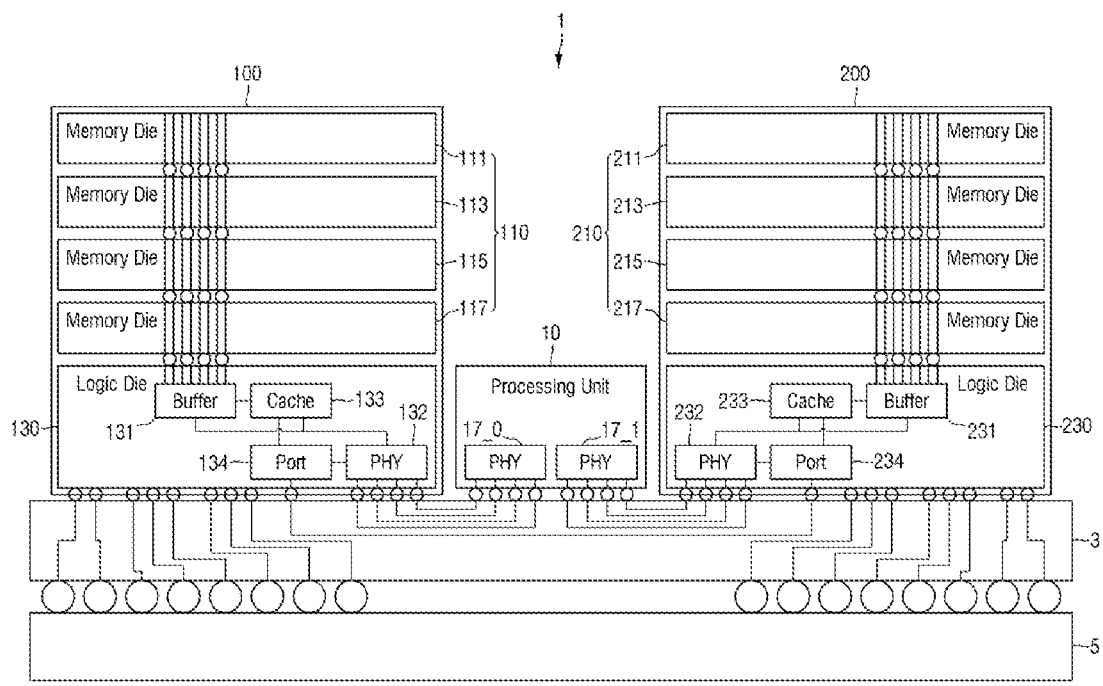
FIG. 6 is a cross-sectional view of a memory unit and a processing unit for explaining a connection between the processing unit and the two memory units according to an exemplary embodiment of the present inventive concept.

FIG. 6 is a cross-sectional view of a processing unit and a memory unit for explaining a connection between the processing unit and two memory units according to an exemplary embodiment of the present inventive concept.

For convenience of explanation, the contents explained using FIG. 3 will not be explained.

Referring to FIG. 6, the semiconductor device 1 according to an exemplary embodiment of the present inventive concept includes a processing unit 10, and a plurality of memory units 100 and 200 connected to the processing unit 10. In an exemplary embodiment, the processing unit 10 is provided with PHYs 17_0 and 17_1, the first memory unit 100 is provided with PHY 132, and the second memory unit 200 is provided with PHY 232 electrically connected to each other via the interposer 3. For example, PHY 132 may be electrically connected to PHY 17_0 via the interposer 3 and PHY 232 may be electrically connected to PHY 17_1 via the interposer 3.

As illustrated, the PHY 132 is arranged in the first logic area 130 of the first memory unit 100, the processing unit 10 includes a plurality of PHYs 17_0 and 17_1, and the PHY 232 is arranged in the second logic area 230 of the second memory unit 200. The processing unit 10 may be connected to the first memory unit 10 via the PHY 17_0 and the PHY 132 and may be connected to the second memory unit 200 via the PHY 17_1 and the PHY 232 to transmit and receive data, commands and the like.

Figure 7:
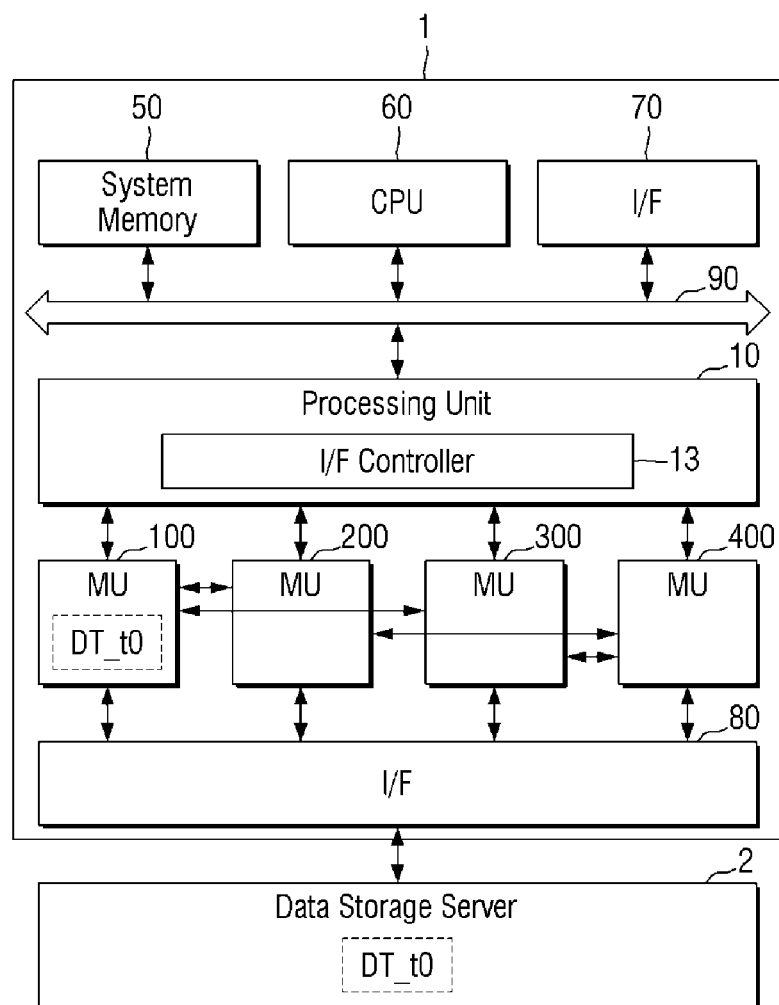
FIGS. 7 and 8 are block diagrams for explaining communication between a memory unit and a server implemented via an interface connected to the memory unit according to an exemplary embodiment of the present inventive concept.
Figure 8:
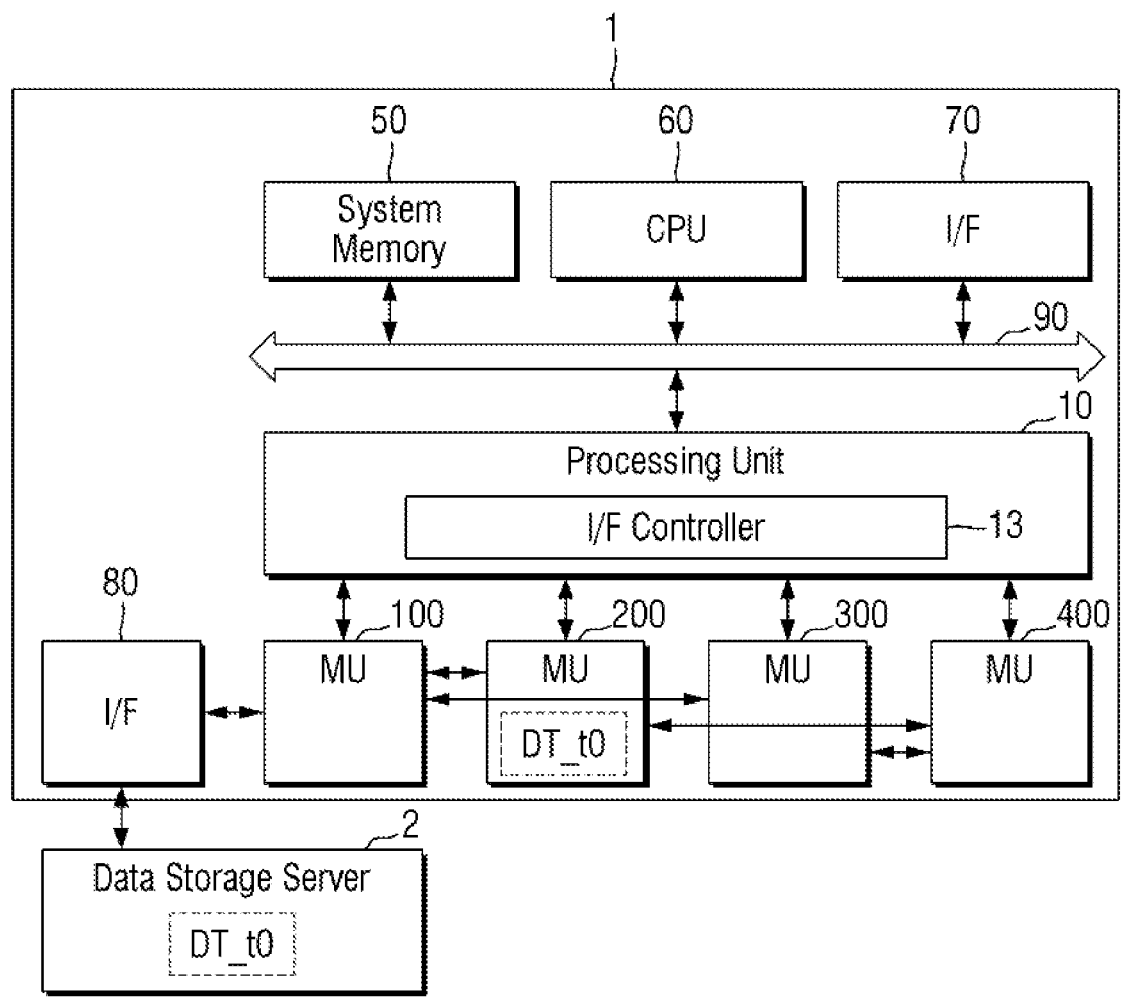

FIGS. 7 and 8 are block diagrams for explaining communication between a memory unit and a server implemented via an interface connected to the memory unit according to an exemplary embodiment of the present inventive concept.

Referring to FIG. 7, the semiconductor device 1 according to an exemplary embodiment of the present inventive concept includes a processing unit 10, a system memory 50, a CPU 60, a first interface 70, and a data bus 90. Also, the semiconductor device 1 may include a first memory unit 100, a second memory unit 200, a third memory unit 300 and a fourth memory unit 400 connected to the processing unit 10, and may further include a second interface 80 electrically connected to the first to fourth memory units 100, 200, 300 and 400.

When user data stored in the memory unit electrically connected to the processing unit 10, data processed by the processing unit 10 and the like are transmitted to the server 2, or data is received from the server 2, the processing unit 10 receives the data from the memory unit with the data stored therein via the control of the CPU 60, the received data is stored in the system memory 50 via the data bus 90, and there is a need to perform communication with the server 2 via the first interface 70 on the basis of the received data. Further, when there is a need to move data between the plurality of memory units 100, 200, 300 and 400 connected to the processing unit 10, the data may be transferred via the processing unit 10. However, use of the processing unit 10 to perform the transfer is inefficient.

When performing a parallel operation using a plurality of processing units (e.g., GPUs), the accuracy of an artificial neural network trained through data exchange between the processing units may be improved. However, frequently occurring data loading between the processing units and data exchange between the processing units may reduce utilization of the processing unit. Therefore, it is possible to improve utilization of the processing unit, by sharing data between the memories via direct communication without transmitting and receiving the data via the processing unit to which the memory is connected.

A direct communication between the plurality of memory units 100, 200, 300 and 400 electrically connected to the processing unit 10 is enabled according to an exemplary embodiment of the present inventive concept, when there is a need for data exchange between the memory units 100, 200, 300 and 400, by directly exchanging the data between the memory units 100, 200, 300 and 400 without intervention of an intermediate path such as a processor and a data bus 90, thereby increasing the efficiency of the system.

Further, since communication with the server 2 is enabled via the second interface 80 connected to the respective memory units 100, 200, 300 and 400, and data transmission and reception with the server 2 is enabled without intervention of a CPU 60 or the like, efficiency of the system may be increased.

According to an exemplary embodiment, data transmission and reception between the plurality of memory units 100, 200, 300 and 400 electrically connected to the processing unit 10, data transmission and reception between the plurality of memory units 100, 200, 300 and 400 and the second interface 80, and communication between the second interface 80 and the server 2 is executed under the control of the interface controller 13 that is included in the processing unit 10.

For example, when the first target data DT_t0 stored in the first memory unit 100 is transmitted to the server 2, under the control of the interface controller 13, the first target data DT_t0 stored in the first memory unit 100 is transmitted to the server 2 via the second interface 80.

Referring to FIG. 8, an interface may be connected to one memory unit among the plurality of memory units 100, 200, 300 and 400 electrically connected to the processing unit 10. As illustrated in the drawing, the first memory unit 100 and the second interface 80 may be connected to each other.

In the case of transmitting the first target data DT_t0 stored in the second memory unit 200 to the server 2, the second memory unit 200 transmits the first target data DT_t0 to the memory unit 100 through the serial interface, and the first memory unit 100 transmits the first target data DT_t0 to the server 2 via the second interface 80 connected to the first memory unit 100. When the second interface 80 unit is not connected to all of the plurality of memory units 100, 200, 300 and 400, the number of ports arranged in each of the memory units 100, 200, 300 and 400 decreases, and the circuit may be simplified.

Figure 9:
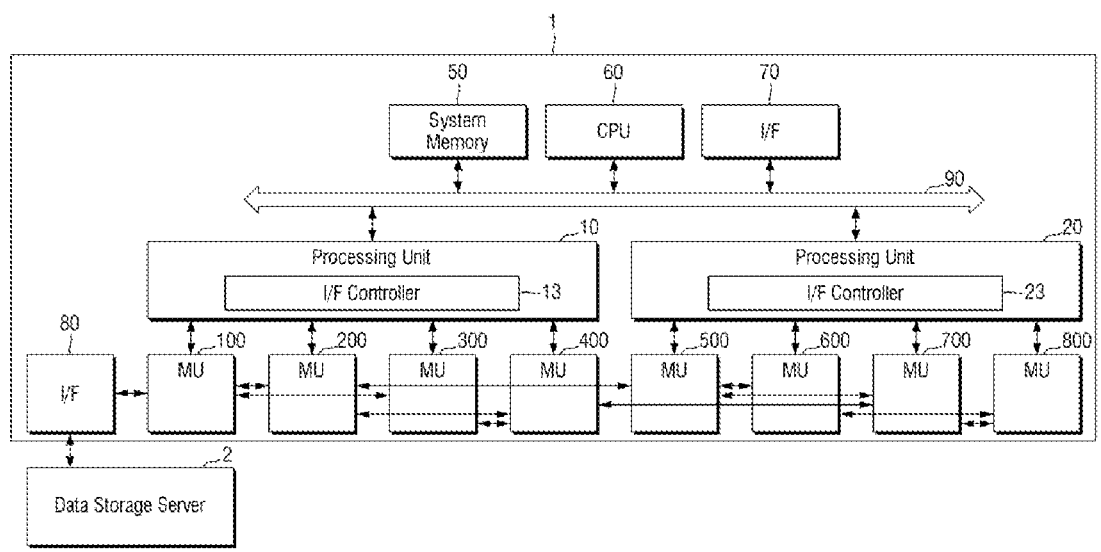
FIG. 9 is a block diagram for explaining a semiconductor device including a plurality of processing units according to an exemplary embodiment of the present inventive concept.

FIG. 9 is a block diagram for explaining a semiconductor device including a plurality of processing units according to an exemplary embodiment of the present inventive concept.

Referring to FIG. 9, the semiconductor device 1 according to the embodiment of the present inventive concept includes a plurality of processing units 10 and 20. As an example, it is assumed that the semiconductor device 1 includes a first processing unit 10 and a second processing unit 20. Also, the first processing unit 10 is electrically connected to a first memory unit 100, a second memory unit 200, a third memory unit 300 and a fourth memory unit 400, and the second processing unit 20 is electrically connected to a fifth memory unit 500, a sixth memory unit 600, a seventh memory unit 700 and an eighth memory unit 800.

According to the embodiment, data transmission and reception between the second memory unit 200 connected to the first processing unit 10 and the fifth memory unit 500 connected to the second processing unit 20 may be enabled, and the direct communication between the fourth memory unit 400 connected to the first processing unit 10 and the seventh memory unit 700 connected to the second processing unit 20 may be enabled. That is, data transmission and reception between memory units connected to processing units different from each other may be enabled.

When deep learning or machine learning are performed, a large capacity memory unit and a plurality of processing units (e.g., GPU) are required. When data transmission and reception between the plurality of processing units is frequently requested and the data transmission and reception between the processing units is not enabled, a temporal damage may occur in communication via the data bus. The processing unit reads the data from the memory electrically connected to the processing unit, even when the data transmission and reception between the processing units is enabled, and in the process of transmitting the data to another processing unit, the I/O operation of the memory is stopped.

According to an embodiment of the present inventive concept, resources of the processing unit used may be reduced through data transmission and reception between the adjacent memory units to reduce power consumption. Further, even in the process of data transmission and reception between the memory units, utilization of the processing unit may be improved.

Figure 10:
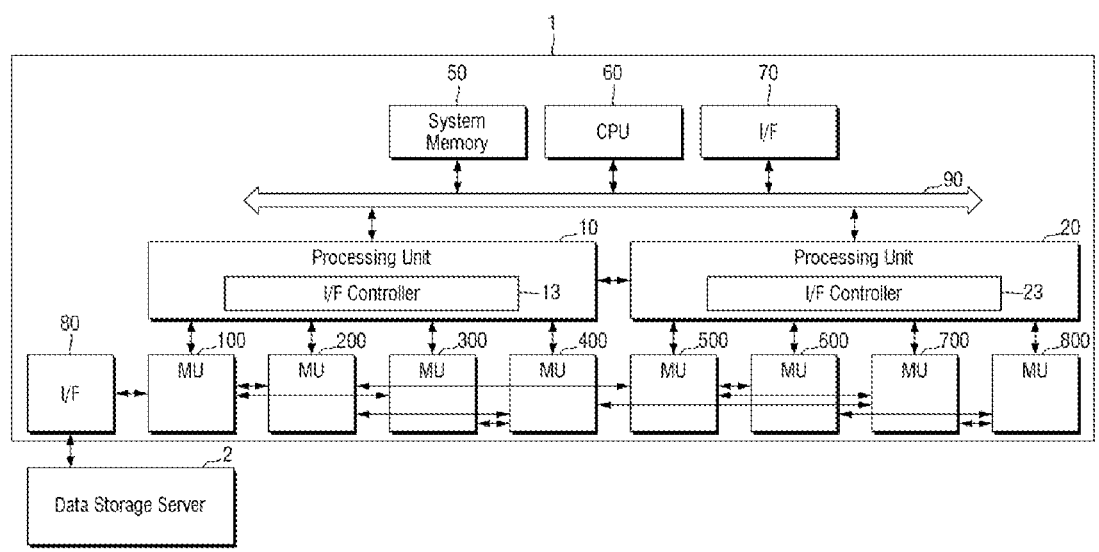
FIG. 10 is a block diagram for explaining communication between two processing units according to an exemplary embodiment of the present inventive concept.

FIG. 10 is a block diagram for explaining communication between two processing units according to an embodiment of the present inventive concept.

Referring to FIG. 10, the semiconductor device 1 according to the embodiment of the present inventive concept transmits and receives data between the plurality of processing units. As illustrated, the first processing unit 10 and the second processing unit 20 may directly transmit and receive data. In the case where direct communication between the processing units different from each other is enabled, by transmitting and receiving data with fewer paths than the case of using an intermediate path such as a data bus, it is possible to shorten the time required for operation and to minimize resources consumed in the system. For example, a dedicated and direct channel may be present between the first processing unit 10 and the second processing unit 20 that enable them to exchange data with one another.

Figure 11A:
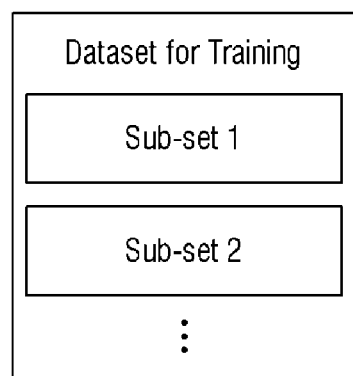
FIG. 11*a* is a diagram for explaining a dataset trained according to an exemplary embodiment of the present inventive concept.
Figure 11B:
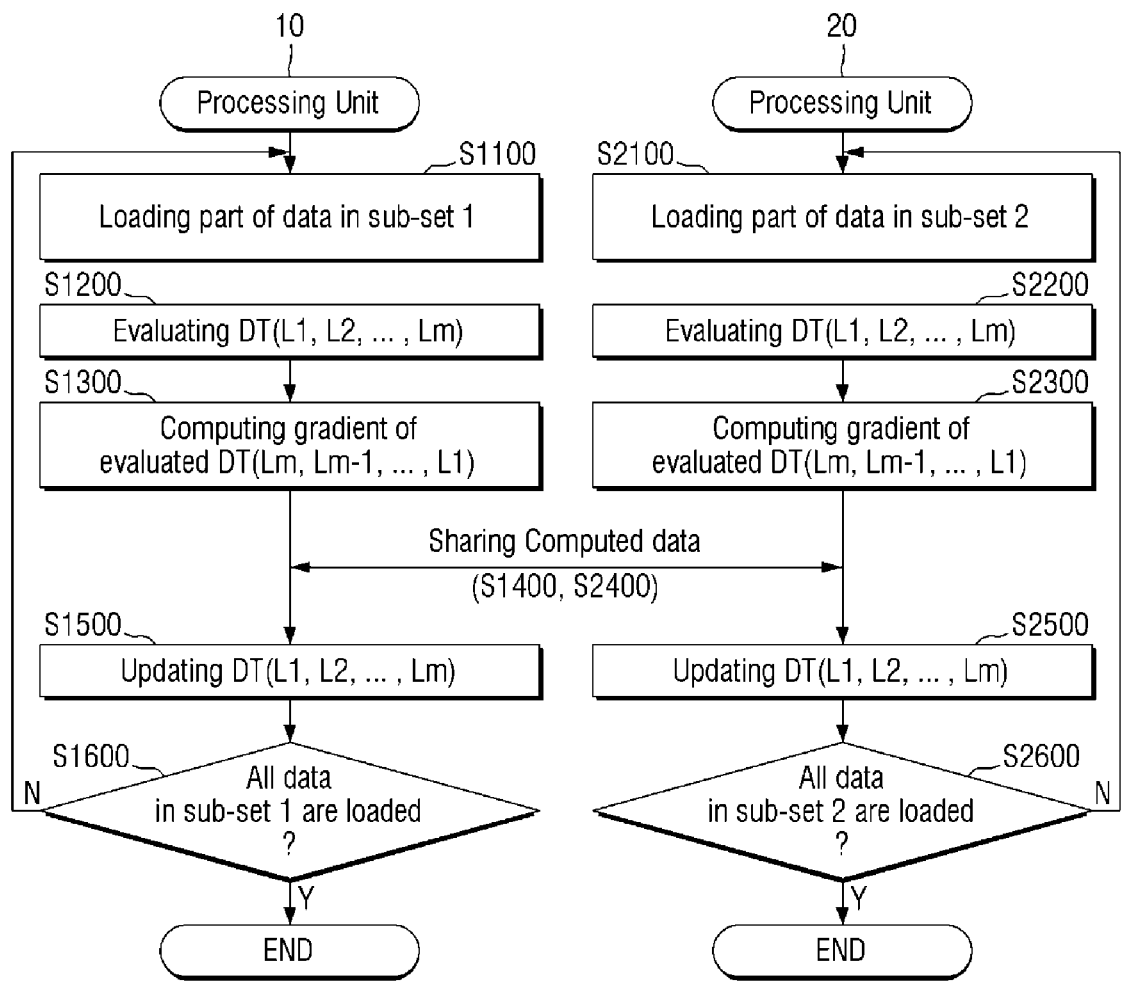
FIG. 11*b* is a flowchart for explaining a process in which data included in the dataset of FIG. 11*a* is processed by the processing unit.
Figure 11C:
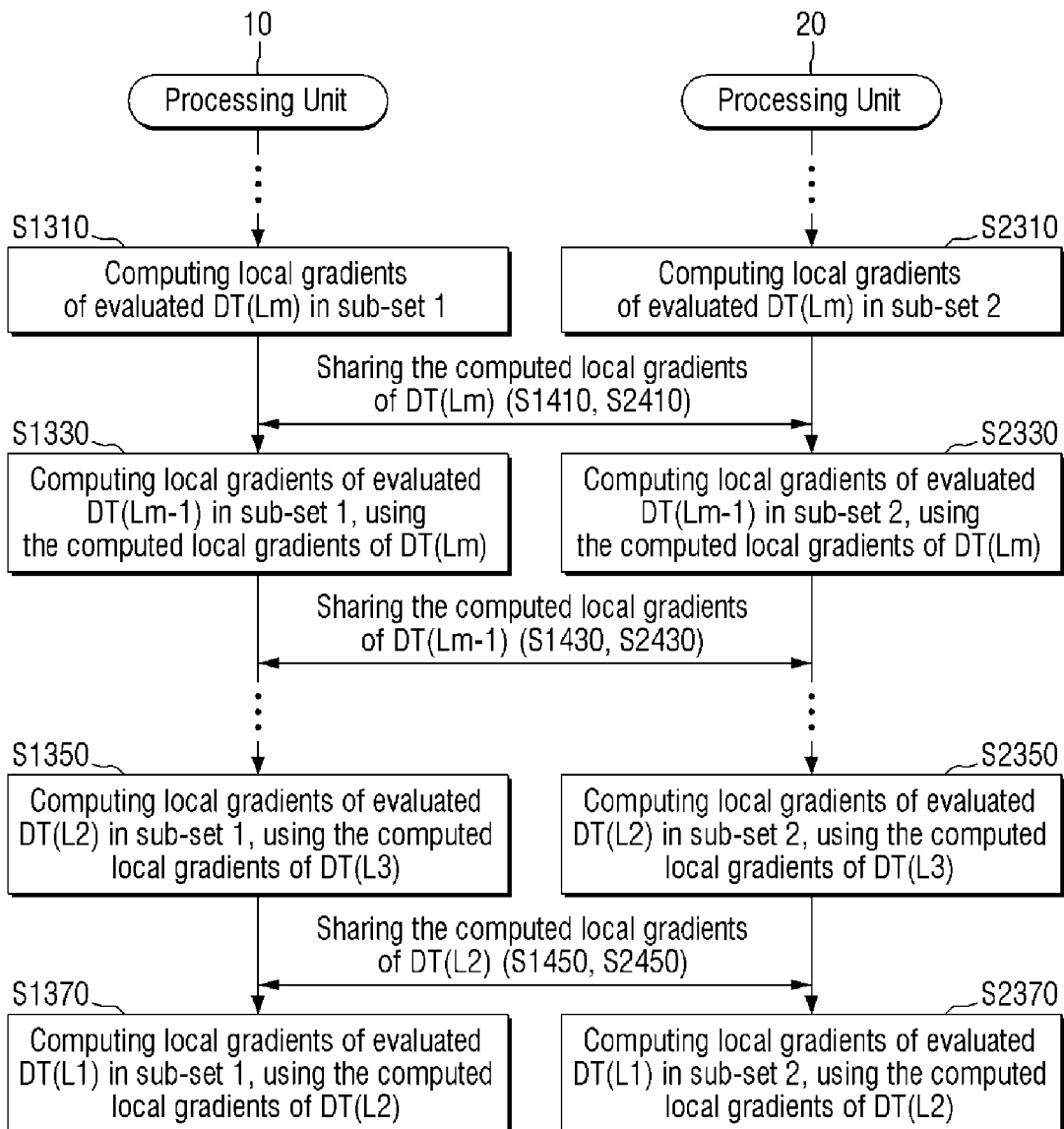
FIG. 11*c* is a flowchart for explaining in detail a process in which a plurality of processing units shares and process the computed data.

FIG. 11a is a diagram for explaining a dataset trained according to an exemplary embodiment of the present inventive concept, and FIG. 11b is a flowchart for explaining a process of processing the data included in the dataset of FIG. 11a by the processing unit. FIG. 11c is a diagram for explaining in detail the process of processing the data by sharing computed data among a plurality of processing units during the process of FIG. 11a.

In operations such as deep learning, training is performed using a large amount of data, and since the size of the data used for a single operation is large, the training speed increases.

Referring also to FIG. 11a, a plurality of sub-sets may be included in the dataset as a training object using an artificial neural network. Each sub-set may include data on the plurality of layers L1 to Lm. Three or more sub-sets may be included in the dataset, but for convenience of explanation, it is assumed below that the dataset includes two sub-sets (Sub-Set1, Sub-Set2). As used herein, a dataset may be represented as a training dataset, and a sub-set may be represented as a sub-dataset. Also, transmission/processing of the "nth layer" may mean "transmission/processing of data on the nth layer".

Referring to FIG. 11b, the first processing unit 10 and the second processing unit 20 according to an embodiment of the present inventive concept may learn from data included in the dataset, and the inference accuracy can be enhanced via the mutual data exchange. In the explanation of FIG. 11b, the first and second processing units 10 and 20 are illustrated to process data via the data sharing, but the inventive concept is not limited thereto, and three or more processing units may be implemented via data sharing.

In step S1100, the first processing unit 10 loads at least some of the data included in the first sub-set (Sub-Set1). Hereinafter, it is assumed that data on the first layer L1 to the mth layer Lm are loaded to become a target of training.

In step S2100, the second processing unit 20 loads at least some of the data included in the second sub-set (Sub-Set2). Likewise, data on the first layer L1 to the mth layer Lm may be loaded to become a target of training.

In step S1200, the first processing unit 10 performs an operation in the order of the first layer L1 to the mth layer Lm. In step S2200, the second processing unit 20 performs the operation in the order of the first layer L1 to the mth layer Lm.

In step S1300, the first processing unit 10 computes the intermediate result of the first layer L1 to the mth layer Lm in the order of the mth layer Lm to the first layer L1 on the basis of the executed operation. In step S2300, the second processing unit 20 computes the intermediate result of the first layer L1 to the mth layer Lm in the order of the mth layer Lm to the first layer Lm, on the basis of the executed operation. In an exemplary embodiment, the intermediate results computed by the first processing unit 10 and the second processing unit 20 include information on the gradient of the data computed by each of them.

In steps of S1400 and S2400, the intermediate result computed by the first processing unit 10 is transmitted to the second processing unit 20, and the intermediate result computed by the second processing unit 20 is transmitted to the first processing unit 10. That is, it is possible to share the intermediate results executed by each of the first processing unit 10 and the second processing unit 20.

In step S1500, the first processing unit 10 performs an update operation of data on the first layer L1 to the mth layer Lm, on the basis of the intermediate result computed by the first processing unit 10 and the intermediate result received from the second processing unit 20.

In step S2500, the second processing unit 20 performs the update operation of data on the first layer L1 to the mth layer Lm, on the basis of the intermediate result computed by the second processing unit 20 and the intermediate result received from the second processing unit 10.

In step S1600, the first processing unit 10 determines whether all the data in the first sub-set (Sub-Set1) is loaded. If it is determined that all the data in the first sub-set (Sub-Set1) is loaded and has been operated on, the operation of the processing operation is ended, and if it is determined that there is unloaded data among the data in the first sub-set (Sub-Set1), unloaded data is loaded and the operation processing according to steps S1100 to S1500 may be repeatedly performed.

In step S2600, the second processing unit 20 determines whether all the data in the second sub-set (Sub-Set2) is loaded. If it is determined that all the data in the second sub-set (Sub-Set2) is loaded and has been operated on, the operation of the processing operation is ended, and if it is determined that there is unloaded data among the data in the second sub-set (Sub-Set2), unloaded data is loaded, and the operation processing according to steps S2100 to S2500 may be repeatedly performed.

Referring to FIGS. 12b and 11c, the step S1300 may include steps of S1310 to S1370, and the step S1400 may include steps of S1410 to S1450. Further, the step S2300 may include steps of S2310 to S2370, and the step of S2400 may include steps of S2410 to S2450.

As described above, in the steps of S1200 and S2200, each of the first and second processing units 10 and 20 performs the operation on data included in the first and second sub-sets (Sub-Set1 and Sub-Set2) in the order of the first layer L1 to the mth layer Lm. The operation performed at this time may be a model evaluating operation for each layer. In steps S1300 and S2300, the first and second processing units 10 and 20 perform computation on the intermediate results of the operations executed in steps S1200 and S2200. In an embodiment, the intermediate result may include gradient information of the evaluated data, and the gradient computing operation may be executed in the reverse order of the evaluation operation executed in the steps of S1200 and S2200. That is, the operation may be executed in the order from the mth layer Lm to the first layer L1.

In steps S1310 and S2310, each of the first and second processing units 10 and 20 performs the gradient computing operation on the mth layer Lm of the first and second sub-sets (Sub-Set1 and Sub-Set2). In steps S1410 and S2410, the first and second processing units 10 and 20 share the computed gradient information of the mth layer Lm.

In the steps of S1330 and S2330, each of the first and second processing units 10 and 20 performs the gradient computing operation on the m−1th layer (Lm−1) of the first and second sub-sets (Sub-Set1 and Sub-Set2). In an embodiment, the data evaluated for the m−1th layer (Lm−1) and the gradient information on the mth layer Lm may be used in the gradient computing operation on the m−1th layer (Lm−1). That is, in addition to the information evaluated in S1200 and S2200, the gradient information computed for the mth layer Lm may be used, and the gradient information computed in another processing unit may be used. For example, the first processing unit 10 may also use the gradient information in the mth layer Lm of the second sub-set (Sub-Set2) computed in the second processing unit 20, in addition to information evaluated for the m−1th layer (Lm−1) of the first sub-set (Sub-Set1) and the gradient information computed for the mth layer Lm of the first sub-set (Sub-Set1), in the gradient computing of the m−1th layer (Lm−1). These operations may be repeated until the gradient computing operation of all the layers Lm to L1 is executed.

According to some embodiments, the gradient computing operation for a particular layer and the operation of sharing the computed gradient of the previous layer may be simultaneously performed by the respective processing units 10 and 20. For example, while the gradient computing operation of the m−1th layer (Lm−1) is performed by the first and second processing units 10 and 20, the computed gradient of the mth layer Lm may be transmitted and received between the memory units electrically connected to the first and second processing units 10 and 20. That is, while the processing unit executes the operation via the interfacing between the memory units according to an embodiment of the present inventive concept, by sharing data necessary for the current operation or the next operation among the memory units, the efficiency of operations performed by the processing unit may be improved.

According to at least one exemplary embodiment of the present inventive concept, it is possible to share the intermediate result computed by each of the plurality of processing units, and to improve inference accuracy of the trained artificial neural network through the update operation based on the shared information.

When the data transmission and reception between the adjacent memory units is executed according to at least one exemplary embodiment of the present inventive concept, during exchange intermediate results (e.g., computed data) required to occur frequently in the operation process, since transmission and reception of data are directly performed between a plurality of memories without going through a plurality of processing units, the utilization of the processing unit may be improved. In addition, when the size of the data shared between the processing units is smaller than the data transmitted and received between the memory unit and the processing unit, and a high transmission speed is not required, data transmission and reception between the plurality of memory units do not require a high speed. Further, since the training order or the form of training (for example, the process in which the operation is executed, the order of the data on which the operation is executed, and the like) are relatively constant, the timing and order of data transmission and reception between the memory units may be easily predicted.

Figure 12:
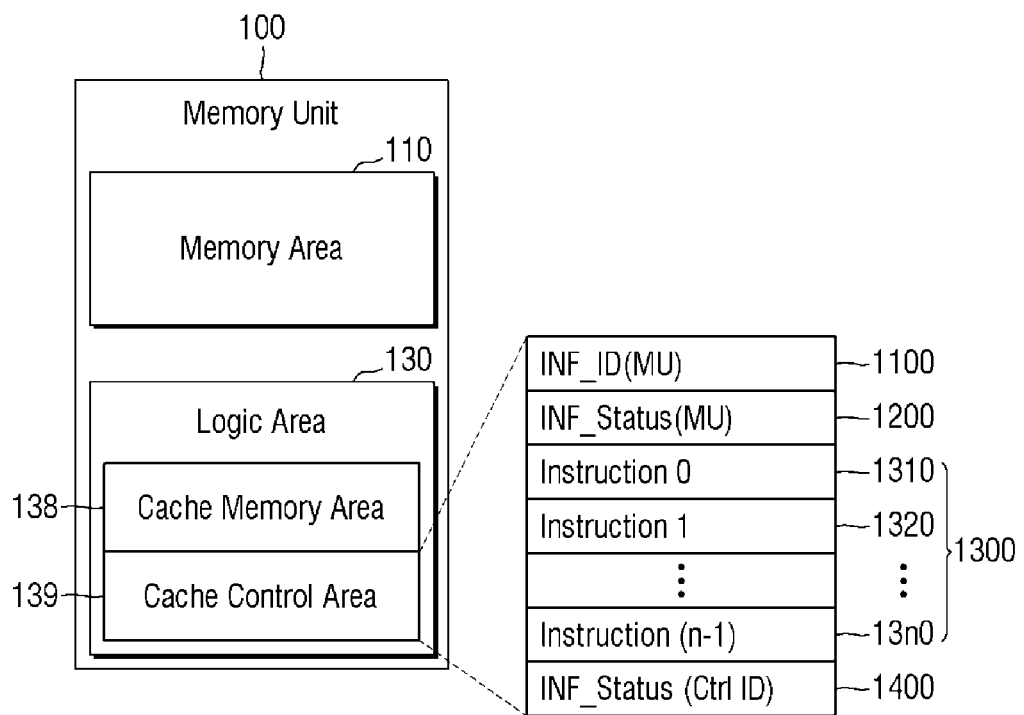
FIG. 12 is a block diagram for explaining the configuration of data stored in the logic area.

FIG. 12 is a block diagram for explaining a configuration of data stored in the logic area.

Referring to FIG. 12, the memory unit 100 according to an embodiment of the present inventive concept includes a memory area 110 and a logic area 130. According to the embodiment, the logic area 130 includes a cache memory area 138 and a cache control area 139. In an embodiment, the cache memory area 138 is an area for temporarily storing the data to be transmitted to the adjacent memory units or data received from adjacent memory units. In an embodiment, the cache control area 139 is an area for storing information and instructions 1300 required for the memory unit 100 to communicate with the adjacent memory units. According to an embodiment, the cache memory area 138 and the cache control area 139 are areas included in a single cache memory (130 of FIG. 1).

According to an embodiment, memory unit ID information (INF_ID (MU)) 1100, memory unit status information (INF_Status (MU)) 1200, instruction 1300, and control ID status information (INF_Status (Ctrl ID)) 1400 are stored in the cache control area 139.

Referring to FIGS. 10 and 12, the semiconductor device 1 according to an embodiment of the present inventive concept includes a compiler that generates a scheduling code of a data path moved in an operation process of data executed by the processing units 10 and 20. For example, the scheduling code may include information on a first path in which data is moved between the processing unit (e.g., 10) and the memory units 100, 200, 300, and 400 connected to the processing unit 10, and a second path in which data is moved between a plurality of memory units 500, 600, 700 and 800 connected to the same processing unit (e.g., 20). According to some embodiments, the scheduling code may include information on a third path in which data is moved between the memory units (e.g., 400 and 700) each connected to the processing units 10 and 20 different from each other. According to some embodiments, the scheduling code may include information on a fourth path in which data is moved between the plurality of processing units 10 and 20 different from each other.

The processing unit 10 may execute an operation on data based on the scheduling code generated by the compiler. For example, when a small amount of data used for an operation is transmitted to the memory unit on a queue basis, input queues may be scheduled so as to be transferred to the processing unit in the form of FIFO (first in-first out). According to some embodiments, the input queues may be stored in the logic area 130 of the memory unit 100. According to some embodiments, the input queues may be stored in the cache memory area 138 of the logic area 130. According to some embodiments, the scheduling code may include information adapted to transfer the queue stored in the logic area 130 to the processing unit 10 via the second path and to transfer the data (e.g., gradient data) required for the operation from the memory area 110 to the processing unit 10 through the first path. In addition, the scheduling code may include information adapted to store data processed by the processing unit 10 in the logic area 130 and to transmit the processed data to the memory unit (e.g., 500) electrically connected to the other processing unit 20 through the third path.

FIG. 13 is a mapping table for explaining a mapping between a physical address and a logical address of each of the memory area and the logic area.

Referring to FIGS. 12 and 13, the memory unit 100 according to an embodiment of the present inventive concept includes a memory area 110 and a logic area 130. In an embodiment, the memory area 110 and the logic area 130 share the same logical address. In other words, each of the memory area 110 and the logic area 130 has a unique physical address, and each physical address may be mapped with logical addresses having indexes different from each other. As illustrated in the drawings, it is assumed that the memory area 110 of the memory unit 100 has a memory area physical address value MPA of a physical address MPA_0 to a physical address MPA_999, and the logic area 130 has a logic area physical address LPA of the physical address LPA_0 to the physical address LPA_499. Specifically, it is assumed that each of the cache memory area 138 and the cache control area 139 included in the logic area 130 has a logic area physical address LPA of the physical address LPA_0 to the physical address LPA_399, and a logic area physical address LPA of the physical address LPA_400 to the physical address LPA_499.

The physical address MPA_0 to the physical address MPA_999 of the memory area 110 may be mapped to the logical address LA_0 to the logical address LA_999, respectively. For example, the position of the memory area 110 having the physical address MPA_1 has the logical address LA_1. Also, the physical address LPA_0 to the physical address LPA_399 of the cache memory area 138 may be mapped to the logical address LA_1000 to the logical address LA_1399, respectively. For example, the position of the cache memory area 138 having the physical address LPA_399 has the logical address LA_1399. Further, the physical address LPA_400 to the physical address LPA_499 of the cache control area 139 may be mapped to the logical address LA_1400 to the logical address LA_1499, respectively. For example, the position of the cache control area 139 having the physical address LPA_400 has a logical address LA_1400.

Since the memory area 110 and the logic area 130 share the same logical address, the processing unit (10 of FIG. 5) do not require separate hardware for transmitting and receiving the addresses different from each other.

According to an embodiment, the mapping table may be stored in the memory area 110, the cache memory area 138 or the cache control area 139 of the memory unit 100. According to another embodiment, the mapping table may be stored in another storage area of the processing unit 10.

Figure 14A:
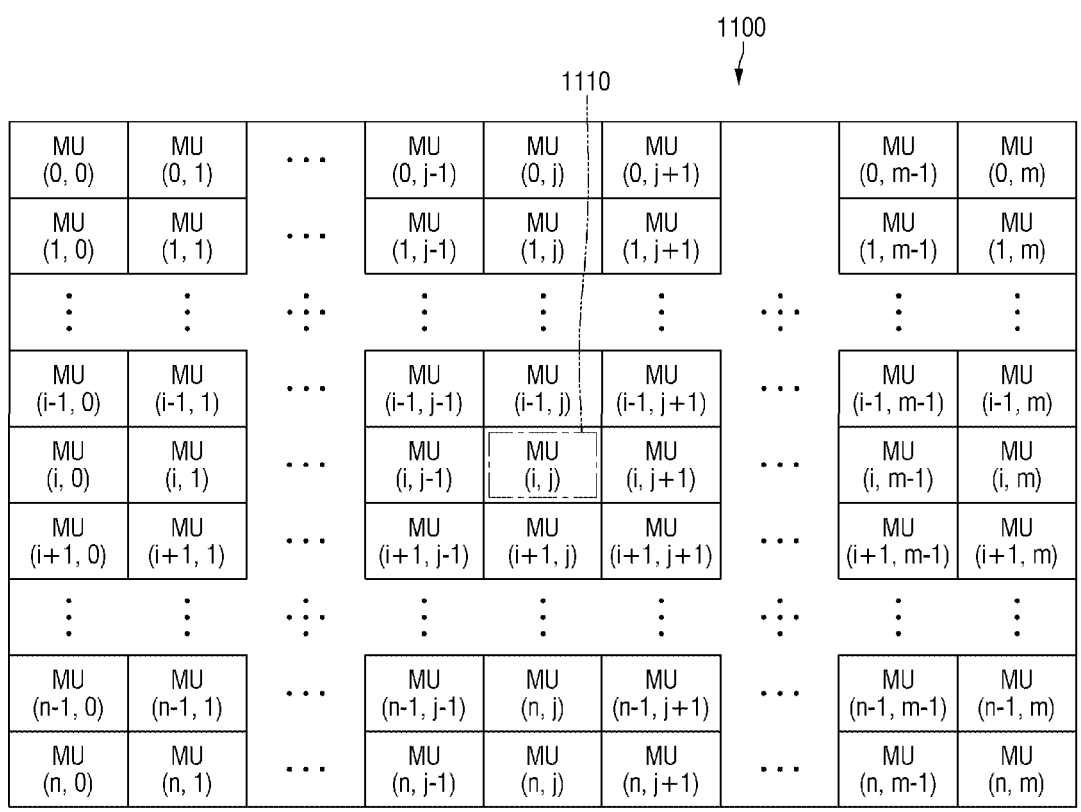
FIG. 14*a* is a diagram for explaining memory unit ID information stored in a cache control area as an example.

Also, FIG. 14a is a diagram for explaining the memory unit ID information (INF_ID (MU)) 1100 stored in the cache control area 139 as an example. The memory unit ID information (INF_ID (MU)) 1100 stored in the cache control area 139 will be described below with reference to FIGS. 12 and 14a. As illustrated in the drawings, it is assumed that a plurality of memory units are located in n+1 rows and m+1 columns, respectively.

The memory unit ID information (INF_ID (MU)) 1100 may include information on the positions of the plurality of memory units. That is, it may include information identifying the row and column in which a specific memory unit is located. For example, the memory unit 1110 located in an i-th row and a j-th column may be expressed in the form of (i, j).

According to an embodiment, the memory unit ID information (INF_ID (MU)) 1100 includes information on the adjacent memory adjacent to each memory unit. For example, when the position in the memory unit ID information 1100 of the memory unit 1110 is (i, j) which means the i-th row and the j-th column, as the adjacent memory, the memory unit (i−1, j) located in the i−1-th row and the j-th column, the memory unit (i, j+1) located in the i-th row and j+1st column, the memory unit (i, j−1) located in the i-th row and j−1th column, and the memory unit (i+1, j) located in the i+1th row and j-th column correspond to the adjacent memory units, and the ID information of the memory unit (i−1, j), the memory unit (i, j+1), the memory unit (i, j−1), and the memory unit (i+1, j) may be stored in the memory unit ID information (INF_ID (MU)) 1100, as the adjacent memory of the memory unit 1110. At this time, the adjacent memory may be defined as a memory unit capable of directly transmitting and receiving data between them. That is, the memory unit 1110 may directly perform the data transmission and reception with the memory unit (i−1, j), the memory unit (i, j+1), the memory unit (i, j−1), and the memory unit (i+1, j). For example, the memory unit 1110 may receive data from memory unit (i−1, j) and forward that data to memory unit (i, j+1).

According to another embodiment, by storing ID information of a memory which is not adjacent to the cache control area stored in each memory unit, it is also possible to transfer data to a non-adjacent memory unit. Referring to FIG. 4 described above, when the first memory unit 100, the second memory unit 200, and the third memory unit 300 are memories located in each of (i, j−1), (i, j), and (i, j+1), the first memory unit 100 and the third memory unit 300 are not adjacent, but since the second memory unit 200 adjacent to the first memory unit 100 stores the ID information of other memory units including the third memory unit 300, the data included in the first memory unit 100 may be transferred to the third memory unit 300 without intervention of another processing unit or the like. In an embodiment, the data stored in the first memory unit 100 is transferred in the order of the first memory unit 100, the second memory unit 200, and the third memory unit 300, and may be stored in the memory area 310, the buffer area 331 or the cache area 333 of the third memory unit 300.

Figure 14B:
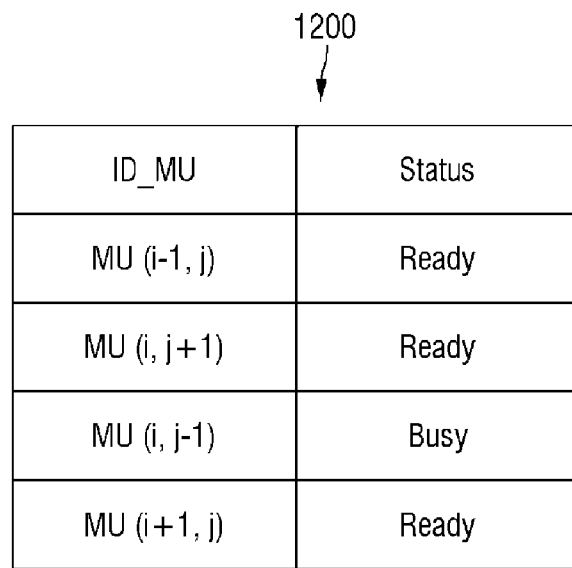
FIG. 14*b* is a diagram for explaining status information stored in the cache control area as an example.
Figure 15:
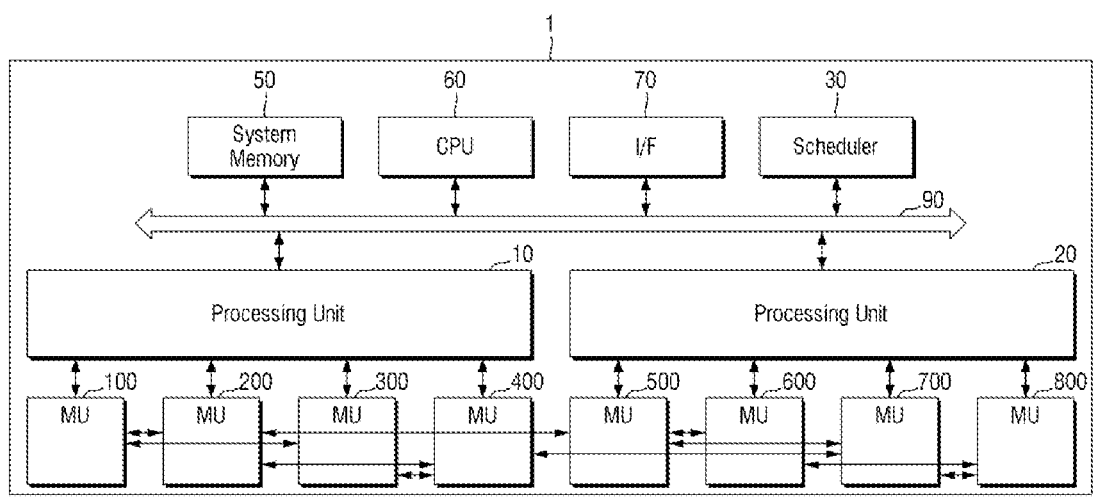
FIGS. 15 to 18 are block diagrams for explaining a semiconductor device including a scheduler according to an exemplary embodiment of the present inventive concept.

FIG. 14b is a diagram illustrating status information stored in the cache control area 139 as an example. Hereinafter, the memory unit status information (INF_Status (MU)) 1200 stored in the cache control area 139 will be described with reference to 12, FIGS. 13, 14a and 14b.

As described above, the adjacent memory of the memory unit 1110 is defined as the memory unit (i−1, j), the memory unit (i, j+1), the memory unit (i, j−1), and the memory unit (i+1, j), and information thereof may be stored in the memory unit ID information (INF_ID (MU)) 1100. In an embodiment, the memory unit status information (INF_Status (MU)) 1200 stored in the cache control area 139 indicates whether the status of the adjacent memory is a ready status or a busy status. In an embodiment, the ready status means that the adjacent memory is in a status in which data transmission and reception of data are enabled, and the busy status means that the adjacent memory is in a status in which transmission and reception of data are not enabled.

As illustrated, the memory unit (i−1, j), the memory unit (i, j+1) and the memory unit (i+1, j) among the adjacent memories of the memory unit 1110 are in the ready status, and the memory unit (i, j−1) is in the busy status. That is, the memory unit (i−1, j), the memory unit (i, j+1) and the memory unit (i+1, j) are in a status in which the data transmission and reception with the memory unit 1110 are enabled, and the memory unit (i, j−1) is in a status in which data transmission and reception with the memory unit 1110 are not enabled.

FIG. 14*c* is a diagram for illustrating the instruction 1300 stored in the cache control area 139 as an example. Information contained in the instruction 1300 will be described below with reference to FIGS. 5, 12, 13, and 14*a* to 14*c*.

The instruction 1300 stored in the cache control area 139 may be stored in the cache control area 139 by the processing unit or may be transferred and stored via the serial interface between the memory units.

The control instruction (Ctrl Instruction) may include information on an operation be executed at the time of data transmission and reception operation with the adjacent memory unit. For example, when data received from the second memory unit 200 and stored in the first cache memory 133 is transmitted to the first memory area 110, a start address of the cache memory 133 in which the data to be transmitted is stored, the size (or length) of data, and a start address of the first memory area 110 in which the data is stored may be included in the control instruction (Ctrl Instruction) of the first memory unit.

As another example, when data stored in the first memory area 110 is transmitted to the second memory unit 200, a start address of the first memory area 110 in which the data to be transmitted is stored, the size (or length) of the data to be transmitted, and a start address of the first cache memory 133 in which the data is stored may be included in the control instruction (Ctrl Instruction) of the first memory unit.

The active information (Active) may define a mode for executing an operation according to the control instruction (Ctrl Instruction). For example, the active information (Active) may include information on a first mode for executing an operation according to the control instruction (Ctrl Instruction) when the instruction 1300 is stored in the cache control area 139 by the processing unit, or a second mode for executing an operation according to the control instruction (Ctrl Instruction) when a start command of the processing unit is received.

The source memory unit ID information (ID_MU (Src)) may be the memory unit ID information of the source memory unit in which the target data as a target of operation according to the control instruction (Ctrl Instruction) is stored. In addition, the destination memory unit ID information (ID_MU ((Dst)) may be the memory unit ID information of the destination memory unit where the target data finally arrives.

The start address information (ADD_MU (Start)) may mean the address information of the source memory unit, and the size information (Length) may mean the size of the target data or the address length of the source memory unit in which the target data is stored.

According to an embodiment, the instruction 1300 further includes priority order information on the source memory unit and the destination memory unit, and the scheduler (30 of FIG. 15) may determine the transmission and reception path between the memory units, on the basis of the priority order information.

According to an embodiment, the scheduler schedules the path of the target data, on the basis of the memory unit ID information (INF_ID (MU)) 1100, the memory unit status information (INF_Status (MU)) 1200, and the instruction 1300 stored in the cache control area 139. The scheduling operation of the scheduler will be described later.

FIGS. 15 to 18 are block diagrams for explaining a semiconductor device including the scheduler according to an exemplary embodiment of the present inventive concept. For the sake of convenience of explanation, the description of the configuration and operation explained with reference to FIGS. 1 to 10 will not be provided.

Referring to FIGS. 12 to 15, the semiconductor device 1 according to the embodiment of the present inventive concept further includes a scheduler 30. The scheduler 30 may schedule a transmission and reception path between the memory units on the basis of the path information. For example, the path information may include at least one of memory unit ID information, the memory unit status information, and the instruction.

Figure 16:
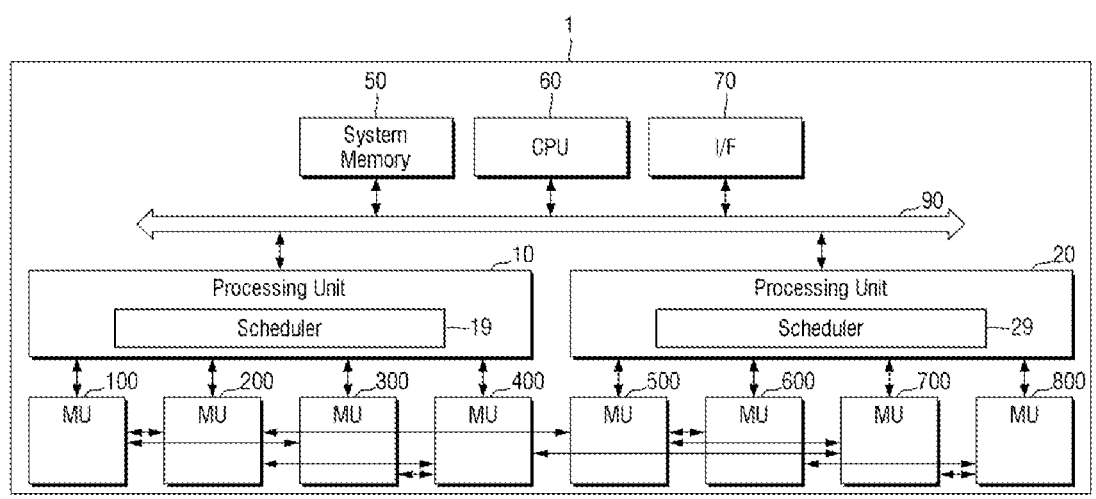

Referring to FIG. 16, the schedulers 19 and 29 are included in the first processing unit 10 and the second processing unit 20, respectively. In this case, the first scheduler 19 schedules the transmission and reception path of the target data in the first memory unit 100, the second memory unit 200, the third memory unit 300 and the fourth memory unit 400 connected to the first processing unit 10. Further, the second scheduler 29 schedules the transmission and reception path in the fifth memory unit 500, the sixth memory unit 600, the seventh memory unit 700 and the second memory unit 800 connected to the second processing unit 20.

Figure 17:
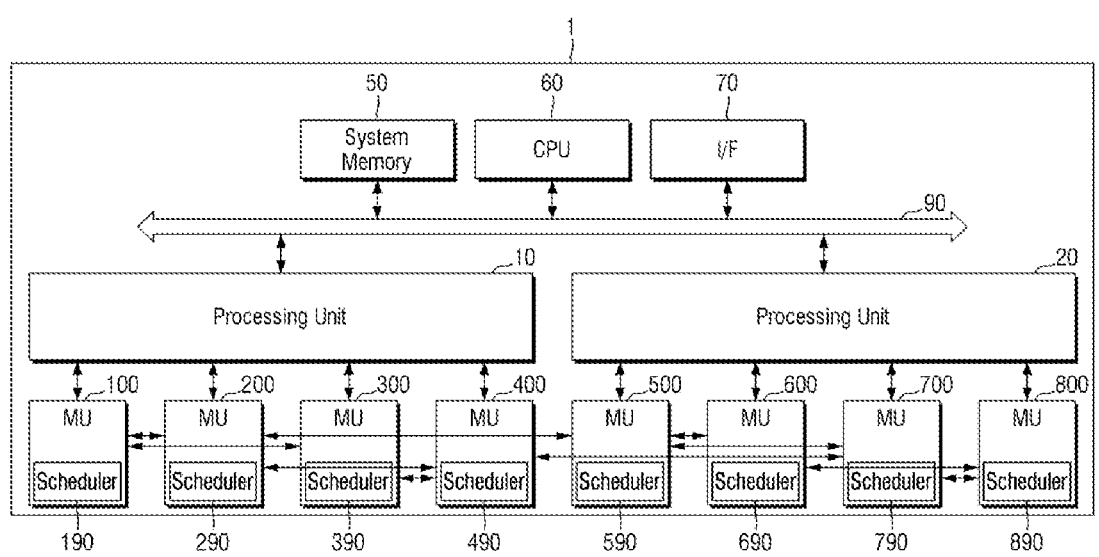

Referring to FIG. 17, the schedulers 190, 290, 390, 490, 590, 690, 790 and 890 are included in each memory unit. For example, the first memory unit 100, the second memory unit 200, the third memory unit 300, the fourth memory unit 400, the fifth memory unit 500, the sixth memory 600, the seventh memory unit 700 and the eight memory unit 800 may include a scheduler 190, a scheduler 290, a scheduler 390, a scheduler 490, a scheduler 590, a scheduler 690, a scheduler 790 and a scheduler 890, respectively. Each scheduler may schedule the transmission and reception path of the target data in the memory unit including the scheduler.

Figure 18:
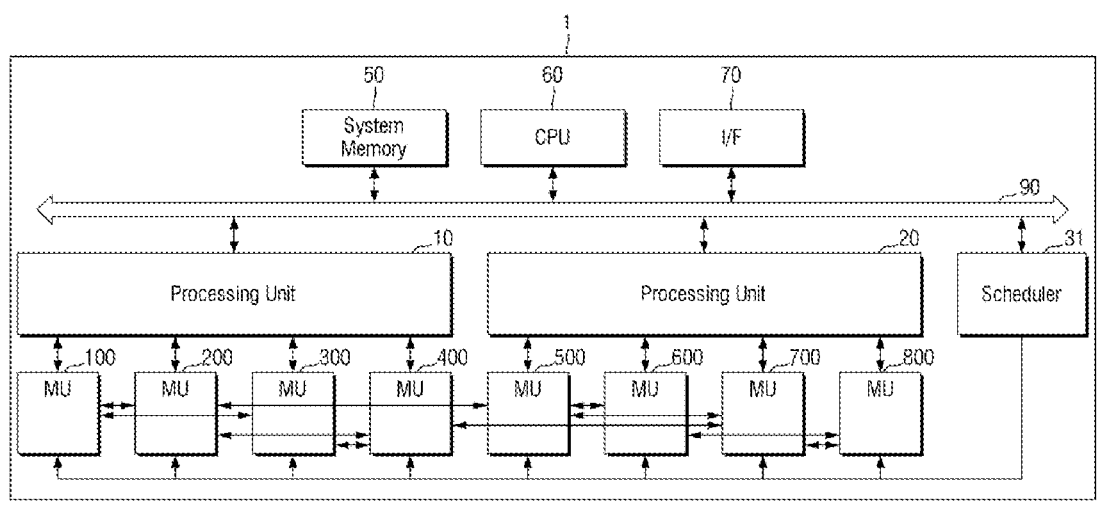

Referring to FIG. 18, the semiconductor device 1 according to an exemplary embodiment of the present inventive concept further includes a scheduler 31. The scheduler 31 schedules the transmission and reception path between the memory units on the basis of the path information. For example, the path information may include at least one of the memory unit ID information (1100 of FIG. 12), the memory unit status information (1200 of FIG. 12), and the instruction (1300 of FIG. 12). As illustrated, the scheduler 31 may be connected to each of the memory units 100 to 800 included in the semiconductor device 1. In this case, the scheduler 31 may directly receive the path information from the respective memory units 100 to 800, and may schedule the data transmission and reception between the memory units on the basis of the path information. In an exemplary embodiment, there is a direct channel between the first processing unit 10 and the second processing unit 20 that enables them to exchange data with one another. In an exemplary embodiment, during a first operation mode, the memory units exchange data with each other without passing through the channel, and in a second other operation mode, the data of a memory unit connected to one of the processing units is transferred to a memory unit connected to the other processing unit using the channel.

Figure 19:
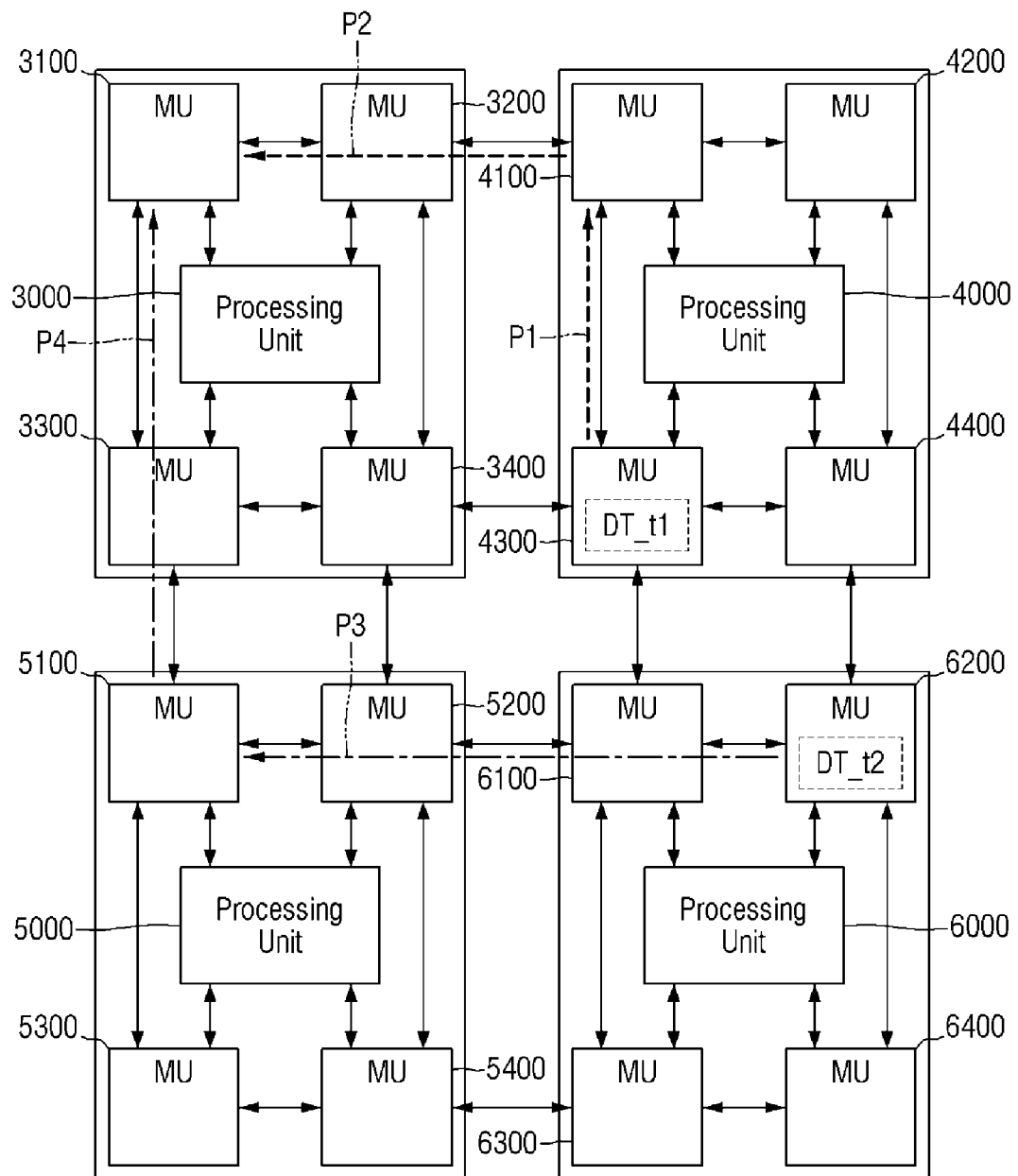
FIGS. 19 to 21 are diagrams for explaining a process in which a target data stored in a source memory unit is transferred to a destination memory unit on the basis of scheduling of the scheduler according to an exemplary embodiment of the present inventive concept.
Figure 20:
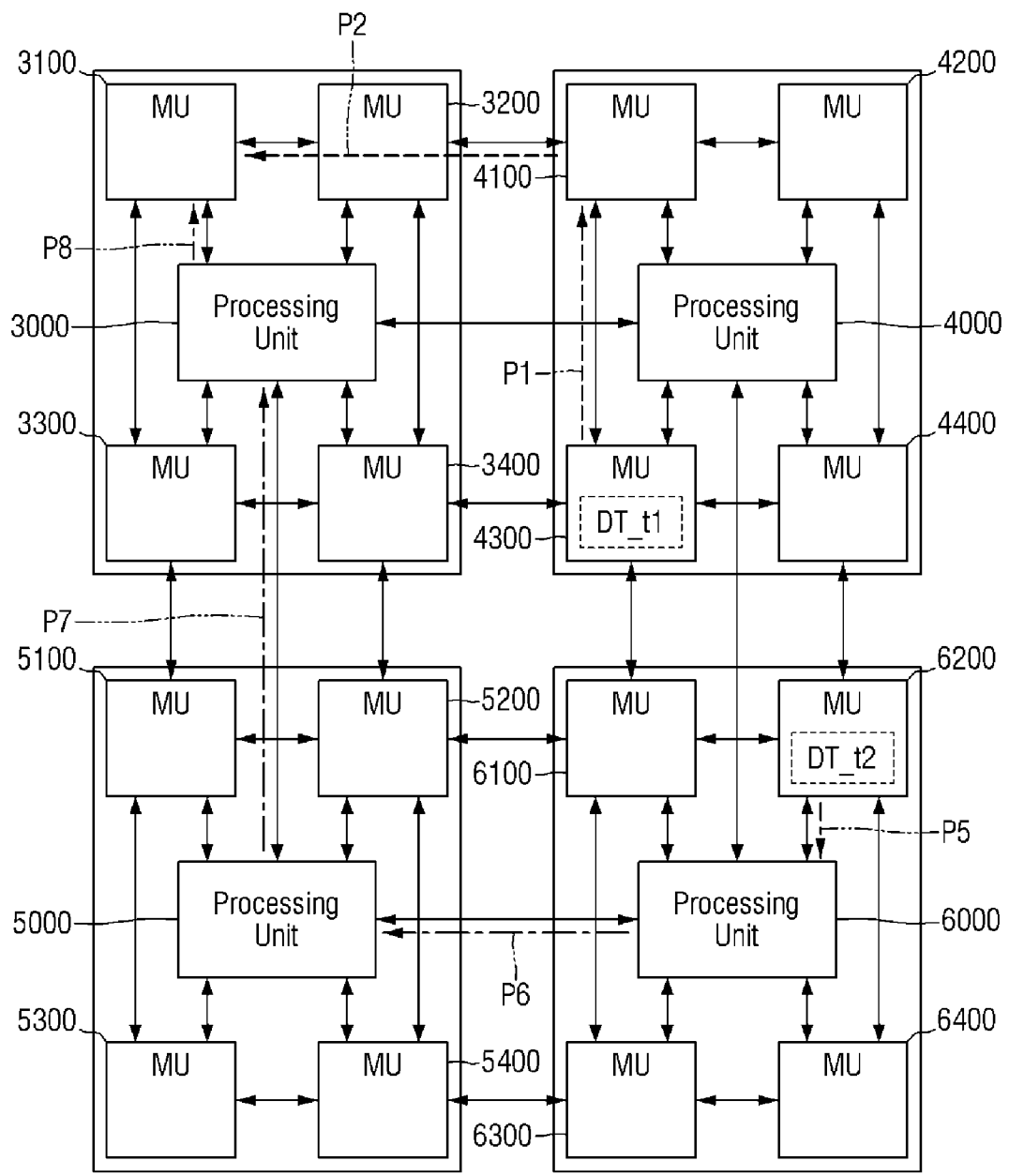
Figure 21:
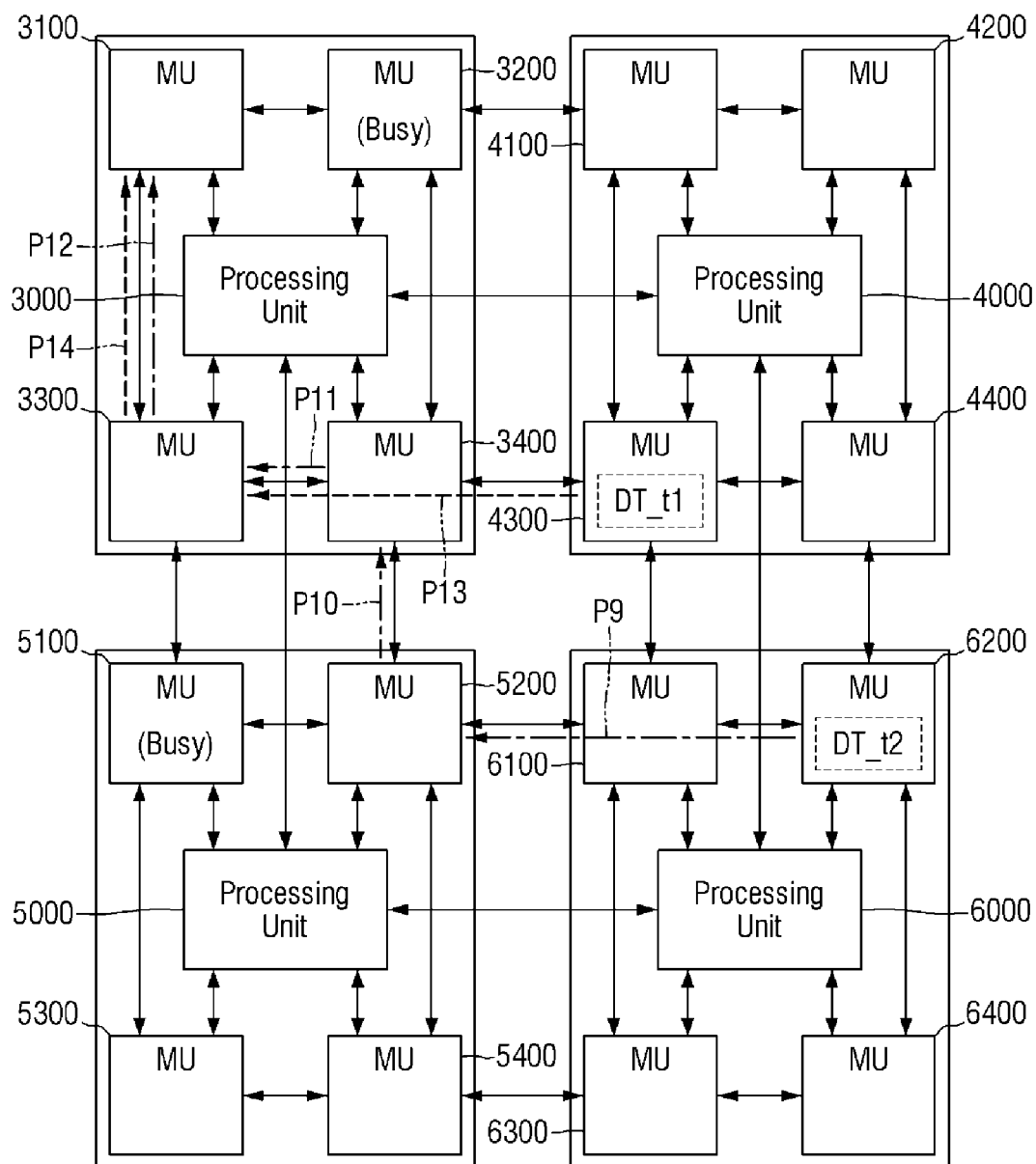

FIGS. 19 to 21 are diagrams for explaining the process in which the target data stored in the source memory unit is transmitted to the destination memory unit on the basis of scheduling of the scheduler according to an embodiment of the present inventive concept.

In describing FIGS. 19 and 21, it is assumed that the third processing unit 3000 connected to the first to fourth memory units 3100, 3200, 3300 and 3400, the fourth processing unit 4000 connected to the fifth to eighth memory units 4100, 4200, 4300 and 4400, the fifth processing unit 5000 connected to the ninth to twelfth memory units 5100, 5200, 5300 and 5400, and the sixth processing unit 6000 connected to the thirteenth to sixteenth memory units 6100, 6200, 6300 and 6400 are arranged, and each memory unit connected to the same processing unit is able to perform the data transmission and reception via the serial interface. Also, data transmission and reception are enabled between the adjacent processing units connected to processing units different from each other, which are indicated by bidirectional arrows in the drawing. Further, it is assumed that the first target data DT_t1 is stored in the seventh memory unit 4300 and the target data DT_t2 is stored in the fourteenth memory unit 6200.

According to an exemplary embodiment, each of the first to sixteenth memory units 3100, 3200, 3300, 3400, 4100, 4200, 4300, 4400, 5100, 5200, 5300, 5400, 6100, 6200, 6300 and 6400 of FIGS. 19 to 21 corresponds to the first memory unit 100 or the second memory unit 200 of FIG. 5, and may have the same configuration as the first or second memory units 100 and 200. In addition, the first to fourth processing units 3000, 4000, 5000 and 6000 of FIGS. 19 to 21 correspond to the processing unit 10 of FIG. 5, and may include the same configuration as that illustrated in FIG. 5. Further, the serial interface between the memory units of FIGS. 19 to 21 may correspond to the first port 134 of the first memory unit 400 or the second port 234 of the second memory unit 200.

Referring to FIG. 19, the operation of transmitting the first target data DT_t1 to the first memory unit 3100 is executed. At this time, the seventh memory unit 4300 which is a memory unit, in which the first target data DT_t1 is stored, is defined as a source memory unit, and the memory unit 3100, which is a memory unit in which the first target data DT_t1 finally reaches, is defined as a destination memory unit.

According to the embodiment, the scheduler schedules the path through which the first target data DT_t1 is transmitted. In an embodiment, it is possible to determine the path on the basis of the path information including the instruction, the memory unit ID information, and the memory unit status information. An instruction may include priority order information between the adjacent memory units. An embodiment which selects the path on the basis of the priority order information will be described below.

First, the scheduler may determine the adjacent memory unit by referring to the memory unit ID information. The adjacent memory unit of the seventh memory unit 4300 which is the source memory unit may be determined as the fourth memory unit 3400, the fifth memory unit 4100, the eighth memory unit 4400 and the thirteenth memory unit 6100.

Thereafter, the path is selected on the basis of the priority order information between the adjacent memories. As illustrated, the fifth memory unit 4100 is selected, and the first target data DT_t1 is transmitted along the first path P1 accordingly. For example, the fifth memory unit 4100 may be selected since the priority order information indicates that the fifth memory unit 4100 has a higher priority than the fourth memory unit 3400, the eighth memory unit 4400 and the thirteenth memory unit 6100.

Thereafter, the scheduler may select the path through the same process, and the first target data DT_t1 reaches the first memory unit 3100 through the second path P2 and may be stored.

In another embodiment, the second target data DT_t2 stored in the thirteenth memory unit 6200 may reach the first memory unit 3100 which is a destination memory unit, through the third path P3 and the fourth path P4 by scheduling of the scheduler, and may be stored.

For the sake of illustrative convenience, it is illustrated that the data transmission and reception between the memory units adjacent to each other are executed, but the present inventive concept is not limited thereto, and data transmission and reception between the non-adjacent memory units may be enabled. For example, it may be implemented so that the data transmission and reception between the first memory unit 3100 connected to the third processing unit 3000 and the eighth memory unit 4400 connected to the fourth processing unit 4000 are enabled.

Referring to FIG. 20, the semiconductor device according to an embodiment of the present inventive concept may execute the data transmission and reception between the processing units. As illustrated, the data transmission and reception are enabled between the third processing unit 3000 and the fourth processing unit 4000, between the fourth processing unit 4000 and the sixth processing unit 6000, between the fifth processing unit 5000 and the sixth processing unit 6000, and between the third processing unit 3000 and the fifth processing unit 5000, which are adjacent processing units.

Referring to FIG. 20, the operation of transmitting the first target data DT_t1 to the first memory unit 3100 is executed. At this time, the seventh memory unit 4300 which is a memory unit in which the first target data DT_t1 is stored is defined as a source memory unit, and the first memory unit 3100 which is a memory unit which the first target data DT_t1 finally reaches is defined as a destination memory unit. The first target data DT_t1 reaches the first memory 3100, which is the destination memory, through the first path P1 and the second path P2 by the path scheduling of the scheduler, and may be stored.

In the case of the path of the second target data DT_t2, a path different from the path determined in FIG. 19 is selected. The data transmission and reception between the processing units are enabled according to an embodiment of the present inventive concept, and the scheduler may determine the data transmission and reception path between the processing units as the path of the second target data DT_t2 on the basis of the path information. As illustrated, data is transmitted to the sixth processing unit 6000 along the fifth path P5 from the thirteenth memory unit 6200 which is the source memory unit, and the second target data DT_t2 is transmitted to the fifth processing unit 5000 which is a processing unit adjacent to the sixth processing unit 6000 along the sixth path P6. Thereafter, the second target data DT_t2 is transmitted from the fifth processing unit 5000 to the third processing unit 3000 along the seventh path P7, and is transmitted to and stored in the first memory unit 3100 connected to the third processing unit 3000, that is, the destination memory unit, along the eighth path P8.

Referring to FIG. 21, the path of the target data may be scheduled on the basis of the memory unit status information. As illustrated, it is assumed that the status information of the second memory unit 3200 and the ninth memory unit 5100 includes the busy status.

In the case of the first target data DT_t1, the scheduler may determine the thirteenth path P13 and the fourteenth path P14 as the transmission path of the first target data DT_t1. That is, in the case of the second path P2 described in the embodiment of FIGS. 19 and 20, it includes the second memory unit 3200 which is in the busy status, and accordingly the scheduler selects a path that excludes the memory unit which is in the busy status.

Similarly, in the case of the second target data DT_t2, the second target data DT_t2 is transmitted from the thirteenth memory unit 6200, which is the source memory, to the tenth memory unit 5200 via the ninth path P9, is transmitted from the tenth memory unit 5200 to the fourth memory unit 3400 via the tenth path P10, is transferred to the third memory unit 3300 via the eleventh path P11, and reaches the first memory unit 3100 which is the destination memory through the twelfth path P12 and is stored therein.

In concluding the detailed description, those skilled in the art will appreciate that many variations and modifications may be made to the exemplary embodiments without substantially departing from the principles of the present inventive concept.

What is claimed is:

1. A semiconductor device comprising:
    a first memory unit comprising a first memory area, and a first logic area electrically connected to the first memory area, the first logic area including a cache memory and an interface port for executing a data transmission and reception operation; and
    a scheduler configured to schedule a data transmission and reception path including an adjacent memory unit adjacent to the first memory unit,
    wherein the first memory unit executes the data transmission and reception operation with the adjacent memory unit via the first interface port using the cache memory, and
    wherein the data transmission and reception operation transfers target data from the first memory unit to a destination memory unit via the adjacent memory unit based on path information stored in the cache memory identifying the adjacent memory unit and status information stored in the cache memory indicating whether a status of the adjacent memory unit is a ready status or a busy status, and the scheduler determines the transmission and reception path to include only an adjacent memory unit of the ready status.

2. The semiconductor device of claim 1, wherein the first memory unit executes the data transmission and reception operation between the first memory unit and the adjacent memory unit, using a serial interface.

3. The semiconductor device of claim 1,
    wherein the scheduler schedules the data transmission and reception path between one or more second memory units electrically connected to the first memory unit,
    wherein the first memory unit executes the data transmission and reception operation with one of the second memory units via the data transmission and reception path scheduled by the scheduler.

4. A semiconductor device comprising:
    a plurality of first memory units each including a cache memory and an interface port; and
    a first processing unit electrically connected to the plurality of first memory units and executes an operation based on data stored in the plurality of first memory units,
    wherein the plurality of first memory units executes a data transmission and reception operation between the plurality of first memory units, using the cache memory and the interface port, and
    wherein the first processing unit includes an interface controller which controls the data transmission and reception operation between the plurality of first memory units.

5. The semiconductor device of claim 4, wherein the plurality of first memory units executes the data transmission and reception operation between the plurality of first memory units, using a serial interface.

6. The semiconductor device of claim 4, further comprising:
    a plurality of second memory units each including a cache memory and an interface port; and
    a second processing unit electrically connected to the plurality of second memory units and executes an operation based on data stored in the plurality of second memory units,
    wherein target data required for the operation of the first processing unit or the second processing unit is one of i) transmitted or received between the plurality of first memory units and the plurality of second memory units and ii) transmitted or received between the first processing unit and the second processing unit, depending on an operation mode.

7. A semiconductor device comprising:
    a first processing unit and a second processing unit;
    a plurality of first memory units electrically connected to the first processing unit and each including a first memory area and a first cache area, each of the first memory area and the first cache area sharing a logical address;
    a plurality of second memory units electrically connected to the second processing unit and each including a second memory area and a second cache area, the second memory area and the second cache area sharing the logical address; and
    a scheduler which schedules a transmission and reception path between the first memory units and the second memory units on target data stored in the first memory area or the second memory area,
    wherein the scheduler schedules the transmission and reception path on a basis of path information stored in the first cache area or the second cache area,
    wherein the path information identifies a source memory unit in which the target data is stored and an adjacent memory unit adjacent to the source memory unit through which the target data passes before arriving at a destination memory unit.

8. The semiconductor device of claim 7, wherein the path information comprises ID information of each of the first memory unit and the second memory unit, ID information of the source memory unit and the adjacent memory unit, status information of the adjacent memory unit, and an instruction on scheduling of the transmission and reception path, and the scheduler determines the transmission and reception path to the destination memory unit to which the target data finally arrives on the basis of the path information.

9. The semiconductor device of claim 8, wherein the status information indicates whether a status of the adjacent memory unit is a ready status or a busy status, and the scheduler determines the transmission and reception path to include only an adjacent memory unit of the ready status.

10. The semiconductor device of claim 8, wherein the instruction comprises priority order information on the source memory unit and the destination memory unit, and the scheduler determines the transmission and reception path on the basis of the priority order information.

11. The semiconductor device of claim 8, wherein the path information further comprises operation mode information which includes a first mode in which data is transmitted and received between the first memory unit and the second memory unit, and a second mode in which data is transmitted and received between the first processing unit and the second processing unit, and the scheduler determines the transmission and reception path on the basis of the operation mode information.

12. The semiconductor device of claim 7, wherein the scheduler is included in the first cache area included in each of the plurality of first memory units and the second cache area included in each of the plurality of second memory units, and each of the schedulers schedules the transmission and reception path of the target data in a memory unit including the scheduler.

13. The semiconductor device of claim 7, wherein the scheduler is included in each of the first processing unit and the second processing unit, and each of the schedulers schedules the transmission and reception path of the target data in the memory unit connected to the processing unit including the scheduler.

14. The semiconductor device of claim 7, further comprising:

an interface controller which controls transmission and reception of the target data in the first memory unit and the second memory unit, wherein the interface controller controls transmission and reception of the target data on the basis of the scheduled transmission and reception path.

15. The semiconductor device of claim 14, wherein the interface controller is included in the first cache area included in each of the plurality of first memory units and the second cache area included in each of the plurality of second memory units, and controls transmission and reception of the target data in the memory unit including the interface controller.

16. The semiconductor device of claim 14, wherein the interface controller is included in each of the first processing unit and the second processing unit, and controls transmission and reception of the target data in a memory unit connected to a processing unit including the interface controller.

* * * * *